US012600827B2

(12) United States Patent
Feng et al.

(10) Patent No.: US 12,600,827 B2
(45) Date of Patent: Apr. 14, 2026

(54) METHOD FOR THE SYNTHESIS OF A TWO-DIMENSIONAL OR QUASI-TWO-DIMENSIONAL POLYMER FILM, THE TWO-DIMENSIONAL OR QUASI-TWO-DIMENSIONAL POLYMER FILM AND THE USE

(71) Applicant: MAX-PLANCK-GESELLSCHAFT ZUR FÖRDERUNG DER WISSENSCHAFTEN E.V., Munich (DE)

(72) Inventors: Xinliang Feng, Dresden (DE); Renhao Dong, Dresden (DE); Kejun Liu, Dresden (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 250 days.

(21) Appl. No.: 17/634,200

(22) PCT Filed: Aug. 11, 2020

(86) PCT No.: PCT/EP2020/072479
§ 371 (c)(1),
(2) Date: Feb. 9, 2022

(87) PCT Pub. No.: WO2021/028429
PCT Pub. Date: Feb. 18, 2021

(65) Prior Publication Data

US 2022/0325053 A1 Oct. 13, 2022

(30) Foreign Application Priority Data

Aug. 13, 2019 (EP) .................................... 19191470

(51) Int. Cl.
*C08J 5/18* (2006.01)
*C08G 69/32* (2006.01)
(Continued)

(52) U.S. Cl.
CPC ................ *C08J 5/18* (2013.01); *C08G 69/32* (2013.01); *C08G 73/0266* (2013.01);
(Continued)

(58) Field of Classification Search
CPC ...... C08J 2377/06; C08J 2379/08; C08J 5/18; C08G 69/32; C08G 73/0266; C08G 73/06;
(Continued)

(56) References Cited

U.S. PATENT DOCUMENTS

| | | |
|---|---|---|
| 4,872,984 A | 10/1989 | Tomaschke |
| 2011/0281098 A1 | 11/2011 | Gospodinova et al. |

FOREIGN PATENT DOCUMENTS

| | | |
|---|---|---|
| CN | 109 988 325 A | 7/2019 |
| KR | 100142678 B1 | 7/1998 |

OTHER PUBLICATIONS

Sahabudeen et al. (Wafer-sized multifunctional polyimine-based two-dimensional conjugated polymers with high mechanical stiffness Nature Communications vol. 7, Article No. 13461 (2016)).*
(Continued)

*Primary Examiner* — Alicia J Weydemeyer
(74) *Attorney, Agent, or Firm* — HESLIN ROTHENBERG FARLEY & MESITI P.C.

(57) ABSTRACT

The present invention relates to a method for the synthesis of a two-dimensional or quasi-two-dimensional polymer comprising a surfactant, the two-dimensional or quasi-two-dimensional polymer film and the use for the production of membranes, electronic devices or catalysts.

20 Claims, 15 Drawing Sheets

(51) Int. Cl.
*C08G 73/02* (2006.01)
*C08G 73/06* (2006.01)
*C08G 73/10* (2006.01)

(52) U.S. Cl.
CPC ..... *C08G 73/0627* (2013.01); *C08G 73/1067* (2013.01); *C08G 73/1085* (2013.01); *C08J 2377/06* (2013.01); *C08J 2379/08* (2013.01)

(58) Field of Classification Search
CPC ............ C08G 73/0627; C08G 73/1067; C08G 73/1085
See application file for complete search history.

(56) References Cited

OTHER PUBLICATIONS

Baek et al. (PNAS vol. 113, No. 27, pp. 7414-7419) (Year: 2016).*
Feng et al. (Wafer-sized multifunctional polyimine-based two-dimensional conjugated polymers with high mechanical stiffness. Nature Communications 7:13461 (2016)).*
Daniel J. Murray et al., "Large Area Synthesis of a Nanoporous Two-Dimensional Polymer at the Air/Water Interface", Journal of the American Chemical Society, 2015, 137, 3450-3453.
Q H Yang et al., "Research on Interfacial Polymerization of Pyrrole Assist With Span80 System", IOP Conference Series: Materials Science and Engineering, 137, (2016) 012070, 6 pages.
Hafeesudeen et al., "Wafer-Sized Multifunctional Polyimine-Based Two-Dimensional Conjugated Polymers With High Mechanical Stiffness", Nature Communications, 7:1346, DOI: 10:1038, Nov. 16, 2016, 8 pages, www.nature.com/naturecommunications.
Hafeesudeen et al., "Interfacial Synthesis of Structurally Defined Organic Two-Dimensional Materials: Progress and Perspectives", Dimensionality in Chemistry Chimia 73 (2019) 480-486.
Xu et al., "Ultrafast Epitaxial Growth of Metre-Sized Single-Crystal Graphene on Industrial Cu Foil", Elsevier Science Bulletin 62 (2017) 1074-1080.
Kissel et al., "A Two-Dimensional Polymer Prepared By Organic Synthesis", Nature Chemistry, vol. 4: Apr. 2012, www.nature.com/naturechemistry.
Xiao et al., "Single Crystals of Polythiophene With Different Molecular Conformations Obtained By Tetrahydrofuran Vapor Annealing And Controlling Solvent Evaporation", J. Phys. Chem B 2010, 114, 7452-7460.
Duan et al., "Semiconducting Crystalline Two-Dimensional Polyimide Nanosheets With Superior Sodium Storage Properties", ACS Nano 2019, 13, 2473-2480.
International Search Report (And English translation) and Written Opinion of the International Searching Authority for International Application No. PCT/EP2020/072479 mailed on Nov. 12, 2020.
Wang et al., "Liquid-interface-assisted synthesis of covalent-organic and metal-organic two-dimensional crystalline polymers", 2D Materials and Applications, 2018.

* cited by examiner

SOS 5,10,15,20-(Tetra-4-dihydroxyborylphenyl)porphyrin 1,2,4,5-tetrahydroxybenzene 2,3,6,7-tetrahydroxynaphthalene

METHOD FOR THE SYNTHESIS OF A TWO-DIMENSIONAL OR QUASI-TWO-DIMENSIONAL POLYMER FILM, THE TWO-DIMENSIONAL OR QUASI-TWO-DIMENSIONAL POLYMER FILM AND THE USE

CROSS REFERENCE TO RELATED APPLICATIONS

This application is a national stage filing under section 371 of International Application No. PCT/EP2020/072479 filed on Aug. 11, 2020, and published on Feb. 18, 2021 as WO 2021/028429, which claims priority to European Application No. 19191470.4, filed on Aug. 13, 2019. The entire contents of WO 2021/028429 are hereby incorporated herein by reference.

The present invention relates to a method for the synthesis of a two-dimensional or quasi-two-dimensional polymer comprising a surfactant, the two-dimensional or quasi-two-dimensional polymer film and the use for the production of membranes, electronic devices or catalysts.

Both synthetic and natural polymers play an essential and ubiquitous role in our daily life and they typically can be described by a sequence of linearly connecting repeat units via covalent bonds according to the definition proposed by Hermann Staudinger in the early 1920s (Staudinger 1920).

There have been numerous attempts to go beyond Staudinger's concept and synthesize sheet-like polymers with long-range order along two orthogonal directions, namely two-dimensional (2D) polymers, which can date back to Gee's experiments on interfacial polymerization in 1935 (Gee 1935), Blumstein's cross-linked polymer in interlayer space of montmorillonite clay in 1958 (Blumstein et al. 1958), and Stupp's bulk polymerization within a self-assembled bilayer in 1993 (Stupp et al. 1993).

However, no real structurally-defined 2D polymer has been obtained until the successful discovery of isolation of graphene layer from graphite, a natural 2D polymer (Novoselov et al. 2004, Chen et al. 2012). Xu et al. disclose a method for preparing a single-crystal graphene on industrial Cu foil. Xu et al. describe a graphene film of (5×50) $cm^2$ dimension with >99% ultra-highly oriented grains (Xu et al. 2017).

The discovery of graphene has also inspired vigorous research efforts devoted to rational synthesis of 2D polymers. Bieri et al. describe the surface assisted synthesis of 2D poly(m-phenylene) networks (Bieri et al. 2009). Grill et al. disclose the covalent assembly of porphyrin building blocks and Cardenas et al. disclose covalent assemblies of thiophene via on-surface synthesis under ultra-high vacuum (Grill et al. 2007, Cardenas et al. 2013). Disadvantageously, the mobility of monomers on the surface is limited and only small domain sizes (generally tens of nanometres) are obtainable.

CN 109 988 325 A discloses large-area ultra-thin high-crystalline two-dimensional conjugated polymer films, wherein "high crystalline" means different from the general amorphous film; a preparation method by chemical vapor deposition to prepare a two-dimensional conjugated polymer film by interfacial copolymerization of an aromatic conjugated monomer solid source on a surface of a substrate, preferably a copper or gold foil; and application thereof.

Xiao et al. describes single needle-like crystals of polythiophene, in particular poly(3-hexylthiophene) (P3HT) and poly(3-octylthiophene) (P3OT), with different molecular conformations obtained by tetrahydrofuran vapor annealing of commercial polythiophene and controlling solvent evaporation (Xiao et al. 2010).

Alternatively, 2D polymers can also be achieved through a solution exfoliation of van der Waals (vdWs) layer-stacked 2D covalent-organic frameworks (Bunck and Dichtel 2013) or polymer crystals (Kissel et al. 2012) synthesized by solvothermal method and/or solid-state polymerization. However, the exfoliation of defined thin layer structures as well as the precise control over their lateral sizes and thickness remain a challenge.

Furthermore, Sahabudeen et al. describe the synthesis of free-standing, crystalline, single- or few-layer films of 2D polymers via the air/water and liquid/water interfacial synthesis (Sahabudeen et al. 2016).

Yang et al. disclose a method for synthesis of polymer films by interfacial polymerization of pyrrole assisted with surfactant Span80 and $FeCl_3$ as oxidant at water/chloroform interface (Yang et al. 2016). Yang et al. describe the formation of micelles of the surfactant and in dependence of the surfactant concentration different polypyrrole morphologies including disorderly deposits microspheres, vesicle accumulation and compact skeletal structures. Furthermore, Yang et al. disclose the prepared polypyrrole films having a vesicular structure depending on the surfactant concentration, changing from disorderly deposits microspheres to vesicle accumulation formed, until a relatively compact skeletal structure.

U.S. Pat. No. 4,872,984 A discloses water permeably membranes synthesized by interfacially polymerizing on a microporous support a monomeric, an aromatic polyamine reactant having at least two amine functional groups and a monomeric, aromatic, amine-reactive reactant comprising a polyfunctional acyl halide or mixture thereof.

Sahabudeen et al. describe the interfacial synthesis of structurally defined organic two-dimensional materials via the air/water and liquid/water interfacial synthesis (Sahabudeen et al. 2019), in particular the surfactant bilayer templating method and that such a bilayer surface can be positively or negatively charged or modified with various functional groups, which provide the possibility to guide the growth of ultrathin nanosheets.

US 2011/281098 A1 discloses a method for preparing a polyaniline film on a support by oxidative polymerization of an aniline monomer in an aqueous acid medium, wherein the polymerization takes place in the presence of an oxidizing agent, in particular formic acid; and a salt MXx, in particular a chloride. Preferably, the surface of the support is hydrophilic, the hydrophilic nature being defined by a contact angle of 0 to 80° or less, using water as the liquid for measuring the angle.

Duan et al. describes semiconducting crystalline two-dimensional polyimide nanosheets prepared by a method using hydrogen-bond-induced preorganization of pyromellitic acid (PMA) and melamine (MA) followed by imidization reaction of the obtained planar hydrogen-bonded networks (HBN) under solvothermal process (Duan et al. 2019).

Disadvantageously, the crystallinity of the resultant 2D polymers remains unsatisfactory with small crystalline domain sizes (typically tens of nanometres), which poses a potential limitation to the development of reliable functions for this emerging class of organic 2D materials.

The object of the present invention is to provide a method for the synthesis of a two-dimensional (2D) or quasi-two-dimensional (q2D) polymer film which overcomes disadvantages of the state of the art.

The object has been solved by providing a method for synthesis of a two-dimensional (2D) or quasi-two-dimensional (q2D) polymer film comprising the steps a) Provision of a surfactant monolayer and at least one monomer in a polar solvent,
   wherein the surfactant monolayer aligns with the interface of the polar solvent with air,
   wherein the monomer interacts with the surfactant monolayer,
   wherein the monomer is an aromatic monomer,
b) Initiation of a polymerization of the monomer, and
c) Polymerization and development of a 2D or q2D polymer film.

According to the invention, the method according to the invention is carried out in the order of the steps a), b) and c).

As used herein, the term "polymer films" refers to sheet-like organic macromolecules consisting of connected organic monomers. According to the invention, the polymer films are no metal organic frameworks (MOFs). Advantageously, the polymer films synthesized with the method according to the invention are crystalline and have pores, preferably with a defined pore size. As used herein, the term "crystalline" refers to solid compounds with a regularly ordered structure. The crystallinity can be determined by X-ray diffraction or transmission electron microscopy. Further advantageously, the polymer films synthesized with the method according to the invention are easy-to-transfer.

As used herein, the term "surfactant" (surface active agent) refers to a compound that lowers the surface tension between two liquids or between a gas and a liquid, wherein the surfactant comprises at least one hydrophilic group ("heads") and at least one hydrophobic group ("tails"). Advantageously, the surfactant guides the organization, in particular the molecular orientation, and regulates the polymerization.

In embodiments, the surfactant is selected from cationic, anionic and neutral surfactants.

In an embodiment, the surfactant comprises a C14 to C20 alkyl or alkenyl group, preferably a C16 to C18 alkyl or alkenyl group.

In some embodiments, the surfactant is selected from the group comprising dihexadecyl phosphate, hexadecyl trimethylammonium bromide, lignoceryl alcohol, oleic acid, perfluorooctadecanoic acid, sodium dodecyl benzene sulfonate, sodium (9Z)-octadec-9-en-1-yl sulfate, sodium stearate, stearic acid, triethanolammonium dihexadecylphosphate.

Most preferably, the surfactant is sodium (9Z)-octadec-9-en-1-yl sulfate (SOS) or octadecanoic acid (SA).

The conditions of the formation of surfactant monolayers are known by those skilled in the art. Kaganer et al. describes the formation of Langmuir monolayers (Kaganer et al. 1999). For example, the minimum amount of SOS to form a monolayer with a diameter of 6 cm is ca. 7 μl.

In an embodiment, the amount of surfactant for providing a surfactant monolayer according to step a) is selected according to the surface area of the polar solvent. In embodiments, the amount of surfactant is in the range of 1 μl to 20 μl for a surface area of the polar solvent of 25 $cm^2$ or a surfactant monolayer with a surface area of 25 $cm^2$, respectively, more preferably in the range of 5 μl to 10 μl for a surface area of the polar solvent of 25 $cm^2$ or a surfactant monolayer with a surface area of 25 $cm^2$, respectively. In further embodiments, the amount of surfactant is in the range of 0.04 $\mu l/cm^2$ to 0.8 $\mu l/cm^2$ with regard to the surface area of the polar solvent, preferably in the range of 0.2 $\mu l/cm^2$ to 0.4 $\mu l/cm^2$ with regard to the surface area of the polar solvent.

In an embodiment, the surfactant monolayer aligns with an interface of the polar solvent, wherein the hydrophilic group of the surfactant orientates to the polar solvent and the hydrophobic group orientates to an interface or extend out of the polar solvent. According to the invention, the surfactant monolayer aligns with the interface of the polar solvent with air.

Preferably, the surfactant monolayer is continuous. As used herein, the term "continuous" refers to an uninterrupted and uniform layer.

In embodiments, the surfactant monolayer is formed by addition of a solution of the surfactant in an organic solvent to the polar solvent and evaporation of the organic solvent.

In embodiments, the organic solvent is chloroform.

As used herein, the term "monomer" refers to a molecule that can undergo polymerization.

Preferably, according to step a) a surfactant monolayer and one monomer are provided in a polar solvent. In an alternative embodiment, two or three different monomers are provided in step a).

In embodiments, the monomer is a natural or synthetic monomer, a polar or unipolar monomer and/or a cyclic or linear monomer.

According to the invention, the monomer is an aromatic monomer. Advantageously, aromatic monomers are rigid and planar or slightly bended, preferably forming regularly ordered films by polymerization. Further advantageously, aromatic monomers enable the alignment of the monomers, the chains or the layers, respectively, of the 2D or q2D polymers by π-π interactions.

Thus, the crystallinity is increased.

In preferred embodiments, the monomer comprises an aromatic group, preferably selected from the group comprising benzene, furan, naphthalene, perylene, porphyrin, pyrrole, thiophene, tetraphenylethylene, tetraphenylporphyrin, triphenylbenzene or triphenyltriazine.

Preferably, the monomer is a symmetric monomer. As used herein, the term "symmetric" refers to a molecule which is invariant to reflection or rotation.

In embodiments, the monomer is selected from alcohol, aldehyde, alkyne, amine, anhydride, aniline, boronic acid, carboxylic acid, diamine, diole, β-dione, furan, halocarbon, hydrazine, hydroxyaldehyde, pyrrole, selenophene and/or thiophene. As used herein, the term "halocarbon" refers to a halogenated hydrocarbon. In an embodiment, the halocarbon is an iodinated or brominated hydrocarbon.

In preferred embodiments, the monomer is selected from amines.

In some cases, the monomer is selected from the group comprising

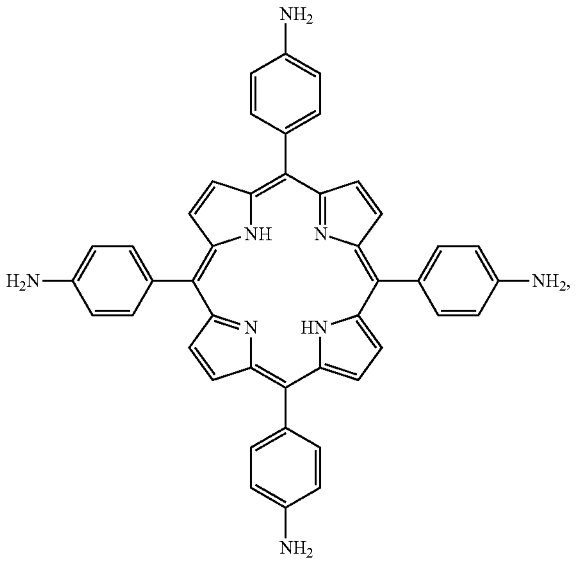

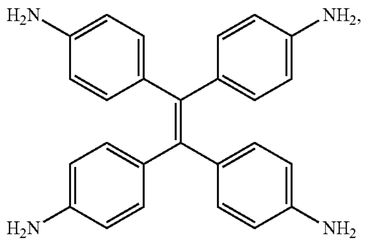

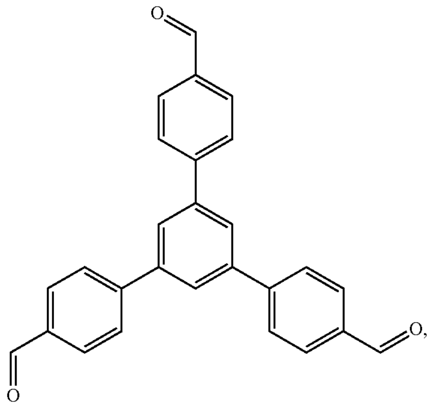

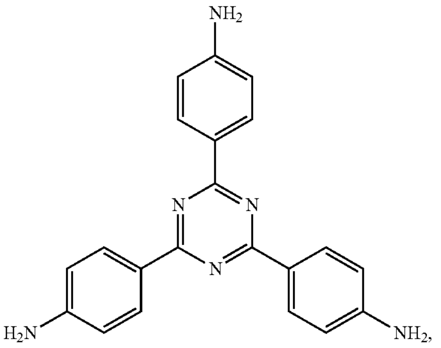

-continued

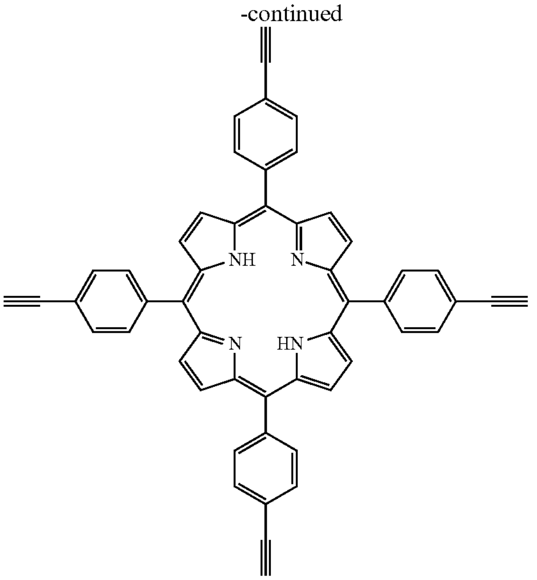

and

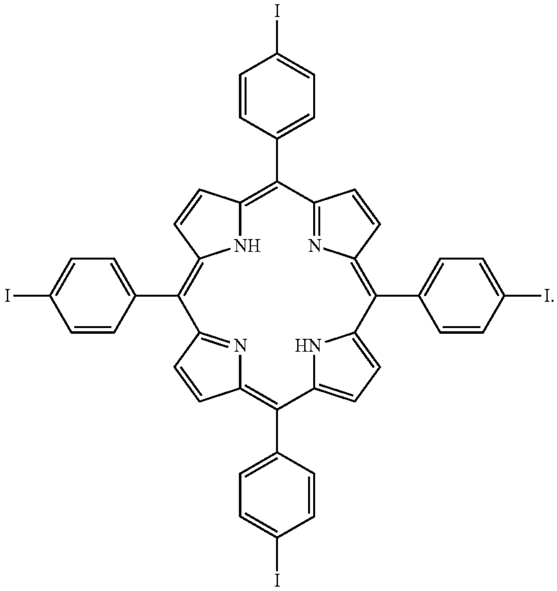

In some embodiments, the monomer is provided with a concentration in the range of 0.1 mM to 5 mM, preferably in the range of 0.15 mM to 1.5 mM.

In an embodiment, the polar solvent in step a) is water and/or a water miscible solvent. In further embodiments, water miscible solvents are selected from the group comprising alcohols, preferably methanol or ethanol; dimethylformamide, acetonitrile. Preferably, the polar solvent is water.

In an embodiment, the hydrophilic group of the surfactant interacts with the monomer, preferably with at least one functional group of the monomer; by electrostatic interaction or a covalent bond. Advantageously, a preorganization of the monomer by the interaction with the surfactant takes place. Preferably, the monomer forms a monolayer by the interaction with the surfactant.

In a preferred embodiment, the surfactant is selected according to the monomer. Advantageously, by the surfactant and monomer selection, the growth direction of the polymerization in step c), in particular a horizontal or vertical growth direction, is modulated.

As used herein, the term “horizontal growth direction” refers to a synthesis in the direction of the interface, preferably the interface of the polar solvent with air; and a layer-stacking direction perpendicular to the interface.

As used herein, the term “vertical growth direction” refers to a synthesis perpendicular to the interface, preferably perpendicular to the interface of the polar solvent with air; and a layer-stacking direction parallel to the interface.

Preferably, electrostatic interaction between surfactant and monomer result in a horizontal growth direction and a covalent bond between surfactant and monomer results in a vertical growth direction.

For a horizontal growth direction, monomers with cationic groups, in particular amino groups, boronic acid or hydrazine; or a positive partial charge are provided with anionic surfactants, in particular sodium (9Z)-octadec-9-en-1-yl sulfate (SOS), Sodium 4-dodecyl benzene sulfonate (SDBS) or triethanol ammonium dihexadecylphosphate (DHP).

For a horizontal growth direction, monomers with anionic groups, in particular carboxylic acid, or a negative partial charge are provided with cationic surfactants, in particular hexadecyl trimethylammonium bromide (CTAB).

For a vertical growth direction, monomers with amino groups, boronic acid or hydrazine are preferably provided with surfactants comprising a carboxylic acid group, in particular stearic acid (SA) or oleic acid (OA).

In further embodiments, the provision of a surfactant monolayer and at least one monomer in a polar solvent with the alignment of the surfactant monolayer at an interface of the polar solvent and the interaction of the monomer with the surfactant monolayer according to step a) is carried out for a period in the range of 30 min to 24 h, preferably in the range of 4 h to 12 h.

In an embodiment, the pH value of the solution in step a), b) and/or c) depends on the selected surfactant, monomer and polymerization reaction.

In a further embodiment, the pH value of the solution in step a) with monomers with cationic groups, in particular amino groups, boronic acid or hydrazine; or a positive partial charge is in the range of pH 2 to pH 6, preferably in the range of pH 3 to pH 4.

In a further embodiment, the pH value of the solution in step b) and/or step c) with monomers with cationic groups, in particular amino groups, boronic acid or hydrazine; or a positive partial charge is in the range of pH 6 to pH 8, preferably in the range of pH 6 to pH 7.

In further embodiments, the polymerization according to step c) is carried out with a temperature in the range of 0° C. to 100° C., preferably 10° C. to 60° C., more preferably 20° C. to 50° C. Advantageously, the method according to the invention can be carried out at low temperatures, preferably at ambient conditions.

In further embodiments, the polymerization according to step c) is carried out for a period in the range of 10 h to 7 d.

In an embodiment, the method according to the invention further comprises the removal of the surfactant after the steps a) to c).

Preferably, the removal of the surfactant is carried out by rinsing or ultrasonic cleaning, preferably with chloroform.

In a further embodiment, the method according to the invention, preferably step c), further comprises the doping of the polymer film. Advantageously, the polymerization and doping of a 2D or q2D polymer film take place simultaneously.

As used herein, the term “doping” refers to an introduction of impurities into a material to modulate the electrical properties. Preferably, doping of the polymer film is carried out with hydrogen chloride. Advantageously, the doped polymer films synthesized with the method according to the invention are electrical conductors.

In some embodiments, the method according to the invention is a copolymerization. The term “copolymerization” refers to the polymerization of at least two kinds of monomer. Advantageously, with the copolymerization 2D polymer films are synthesized. In an embodiment, the polymerization according to step c), in particular the copolymerization, is a condensation reaction.

In some cases of copolymerization, the monomer comprises at least three functional groups, wherein the at least three functional groups of the monomer are identical or different. Preferably, the at least three functional groups are identical.

Preferably, the monomer comprises three to five functional groups, more preferably four functional groups.

In a preferred embodiment, the monomer is selected from alcohol, aldehyde, amine, anhydride, aniline, boronic acid, carboxylic acid, diamine, diole, β-dione, hydrazine and/or hydroxyaldehyde.

Preferably, the monomer is a benzene derivative, a porphyrin derivative, a tetraphenylethylene derivative, a triphenylbenzene derivative or a triphenyl triazine derivative, most preferably 5,10,15,20-(tetra(4-aminophenyl)) porphyrin, tetraniline ethylene, triphenylbenzenealdehyde or trianiline triazine.

In preferred embodiments, the initiation of a polymerization according to step b) is achieved by addition of a further monomer with at least two functional groups.

In embodiments, the further polymer comprises two to four functional groups, preferably two functional groups.

Preferably, the further monomer is a perylene derivative, a naphthalene derivative or a benzene derivative, most preferably isochromeno[4',5',6':6,5,10]anthra[2,1,9-def]isochromene-1,3,8,10-tetrone or 1H,3H-Furo[3,4-f][2]benzofuran-1,3,5,7-tetrone.

In some cases, the further monomer is selected from the group comprising

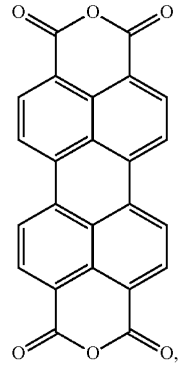,
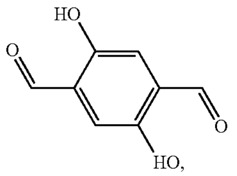,
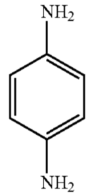
and
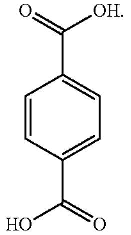.

In embodiments, the monomer and the further monomer are provided with a ratio in the range of 1:1 to 1:5, preferably 1:1 to 1:2.

In an embodiment, the initiation of a polymerization according to step b) is achieved by a catalyst, preferably a vapour catalyst; and/or a base. Advantageously, a vapour catalyst does not significantly change the pH value. Preferably, the vapour catalyst is trifluoromethanesulfonic acid (TfOH). Advantageously, a base increases the solubility of the monomer, in particular the monomer comprising a carboxyl or anhydride group. Preferably, the base is selected from alkali metal hydroxides, in particular LiOH, NaOH and KOH.

In other cases, the monomer comprises at least two functional groups and the further monomer comprises at least three functional groups. In an alternative preferred embodiment, the monomer comprises two functional groups and the further monomer comprises four functional groups.

In another case of the copolymerization, the monomer and further monomer are provided in step a) and the polymerization is initiated in step b) with a catalyst and/or a base.

In some embodiments, the monomer and the further monomer are selected from boronic acid and diole, amine and aldehyde, hydrazine and aldehyde, carbohydrazide and aldehyde, amine and β-dione, amine and anhydride or amine and carboxylic acid.

In another embodiment of the method according to the invention, the polymerization is a homopolymerization. The term "homopolymerization" refers to the polymerization of one kind of monomer. In further embodiments, the polymerization according to step c), in particular the homopolymerization, is selected from oxidation reactions, glasser reaction or Ullmann coupling.

In an embodiment, the monomer comprises one or two functional groups.

In further embodiments, the monomer is selected from the group comprising alkyne, aniline, furan, halocarbon, pyrrole, selenophene and/or thiophene.

In a further embodiment, the initiation of a polymerization according to step b) is achieved by addition of at least one polymerization initiator, such as ammonium persulfate (APS) or iron chloride, preferably APS.

Another object of the invention is a two-dimensional (2D) or quasi-two-dimensional (q2D) polymer film consisting of aromatic monomers, wherein the ratio of crystalline areas to the total surface area is 50% to 100%, wherein the average crystal domain size is in the range of 0.1 $\mu m^2$ to 1 $cm^2$ and wherein the film thickness is in the range of 0.1 nm to 80 nm.

Advantageously, the 2D or q2D polymer film is crystalline. Preferably, the ratio of crystalline areas to the total surface area is 65% to 100%.

In some embodiments, the 2D or q2D polymer film is a polyamide, polyaniline, polyazine, polyboronic acid ester, polyfuran, polyhydrazone, polyimide, polyimine, poly-β-ketoenamine, polypyrrole, polyselenophene or polythiophene.

In embodiments, the 2D or q2D polymer film according to the invention comprises one (single layer) or several layers (multilayer). Advantageously, the layers are chemically and structurally equal.

According to the invention, the thickness of the polymer film is in the range of 0.1 nm to 80 nm, preferably in the range of the thickness of one monolayer to several layers, in particular 1 nm to 40 nm, most preferably in the range of 1 nm to 10 nm. Advantageously, the film thickness of the polymer films synthesized with the method according to the invention is adjustable by the temperature and the reaction time according to step c).

The thickness can be determined by atomic force microscopy (AFM) or transmission electron microscopy (TEM).

According to the invention, the average crystal domain size of the polymer film is in the range of 0.1 $\mu m^2$ to 1 $cm^2$, preferably in the range of 0.1 $\mu m^2$ to 100 $\mu m^2$, more preferably in the range of 1 $\mu m^2$ to 150 $\mu m^2$.

The average crystal domain size can be determined by phase contrast scanning electron microscopy and analysis with ImageJ following a standard "Particle Analysis" protocol.

In embodiments, the structure of the polymer film according to the invention is a square lattice or a dual-pore lattice structure. Advantageously, the structure of the polymer film according to the invention is adjustable by the amount and geometry of the functional groups of the monomer.

In embodiments, the 2D or q2D polymer film according to the invention is a homopolymer or copolymer.

As used herein, the term "2D" polymer film refers to sheet-like monomolecular macromolecule consisting of ordered, via covalent bonds laterally-connected monomers.

In embodiments, the 2D polymer film according to the invention is a polyamide, polyazine, polyboronic acid ester, polyhydrazone, polyimide, polyimine or poly-β-ketoenamine.

As used herein, the term "q2D" polymer film refers to a regularly ordered supramolecular polymer, wherein the polymer chains interact by weak intermolecular interactions. Advantageously, the weak intermolecular interactions between the polymer chains result in an excellent longe range order, in particular in a fully expanded-coil conformation of the polymer chains without chain folding.

In embodiments, the q2D polymer film according to the invention is a polyaniline, polyfuran, polypyrrole, polyselenophene or polythiophene.

In an embodiment, the q2D polymer film according to the invention, preferably the doped q2D polymer film according to the invention, has a lateral conductivity in the range of 1 S $cm^{-1}$ to 200 S $cm^{-1}$, preferably 100 S $cm^{-1}$ to 160 S $cm^{-1}$.

Another aspect of the invention is the use of the 2D or q2D polymer film according to the invention and/or the method for the synthesis of a 2D or q2D polymer according to the invention for the production of membranes, electronic devices or catalysts.

As used herein, the term "membrane" refers to a device which acts as a selective barrier, meaning it allows some molecules or particles to pass through but stops other molecules or particles, more preferably by size exclusion. Advantageously, the 2D or q2D polymer film according to the invention are suitable as membrane materials because of the defined pore sizes.

As used herein, the term "electronic devices" refers to a device, which can affect electrons or their associated fields. Advantageously, the individual polymer chains of the q2D polymer film offer multiple pathways for interchain charge transport and bypass possible defects.

In some embodiments, the electronic device is an electrode, preferably a transparent electrode for displays; a supercapacitor, preferably a flexible supercapacitor for wearable electricity storage devices; or a sensor, preferably for detection of ammonia gas or volatile organic compounds, e.g. acetic acid, heptanal, heptane, heptanoic acid, 3-heptanone, hexanal, hexane, hexanoic acid, 2-hexanone, nonanal, nonane. Advantageously, the polymer film according to the invention, preferably the q2D polymer film according to the invention, is a chemiresistor. As used herein, the term "chemiresistor" refers to a material that changes its electrical resistance in response to changes in the chemical environment.

As used herein, the term "catalyst" refers to a material, which increases the rate of a chemical reaction. In embodiments, the 2D or q2D polymer according to the invention catalyses water splitting, the decomposition of organic compounds in solutions or oxidation reactions.

In further embodiments, the recently described embodiments can be combined, in particular the characteristics of the method according to the invention can be applied to the 2D polymer film and the use of the 2D polymer film according to the invention and/or the method according to the invention. Furthermore, the characteristics of the method according to the invention, in particular the homopolymerization, can be applied to the quasi-2D polymer film. Various changes and modifications within the spirit and scope of the disclosed invention will become readily apparent to those skilled in the art from reading the description and the other parts of the present disclosure.

FIGURES AND EXAMPLES

The present invention will now be further explained by the following non limiting figures and examples.

FIG. 1 shows A) a scheme of the method according to the invention: (i) and (ii) provision of a surfactant (3) and one monomer (1), (i) wherein the surfactant (3) monolayer aligns with the interface of the polar solvent with air, (ii) wherein the monomer (1) interacts with the surfactant (3) monolayer, (iii) initiation of a polymerization of the monomer (1), and (iv) polymerization and development of a 2D or q2D polymer film. B) scheme of polymerization of a monomer, in particular aniline, using electrostatic interaction with the surfactant sodium (9Z)-octadec-9-en-1-yl sulfate (SOS). C) Mechanism of oxidative polymerization of aniline to polyaniline.

FIG. 2 shows a reaction scheme of the synthesis of 2D polymers according to the invention: the monomer 5,10,15,20-(tetra(4-aminophenyl)) porphyrin (1) reacts with isochromeno[4',5',6':6,5,10]anthra[2,1,9-def]isochromene-1,3,8,10-tetrone (2a) using the surfactant SOS (3a) or with 1H,3H-Furo[3,4-f][2]benzofuran-1,3,5,7-tetrone (2b) using the surfactant SOS (7d) or stearic acid (SA) (overnight) (3b) by a condensation reaction to polyimide (2 DPI, 4a) or polyamide (2DPA, 4b).

FIG. 3 shows surface-pressure vs. mean molecular area (π-A) isotherm. A) sodium oleyl sulfate (SOS) and B) stearic acid (SA).

FIG. 4 shows the spectroscopic characterizations of 2D polymers and monomers: A) FTIR spectrum of the monomer 5,10,15,20-(tetra(4-aminophenyl)) porphyrin (1), the further monomer isochromeno[4',5',6':6,5,10]anthra[2,1,9-def]isochromene-1,3,8,10-tetrone (2a), the further monomer 1H,3H-Furo[3,4-f][2]benzofuran-1,3,5,7-tetrone (2b), 2 DPI and 2DPA. B) UV-Vis spectrum of 2 DPI, the monomer 5,10,15,20-(tetra(4-aminophenyl)) porphyrin (1) and the further monomer isochromeno[4',5',6':6,5,10]anthra[2,1,9-def]isochromene-1,3,8,10-tetrone (2a) for the 2 DPI synthesis. C) UV-Vis spectrum of 2DPA, the monomer 5,10,15,20-(tetra(4-aminophenyl)) porphyrin (1) and the further monomer 1H,3H-Furo[3,4-f][2]benzofuran-1,3,5,7-tetrone (2b) for the 2DPA synthesis.

FIG. 5 shows structural characterization of 2 DPI: A) 2 DPI film measured by bright-field transmission electron microscopy (TEM). Dark regions are crystalline. B) Selected area electron diffraction (SAED) pattern from the crystalline domain in (A). The arrows indicate the 100 and 010 reflections at 0.33 $nm^{-1}$ (i.e., 3 nm). C) Aberration corrected high-resolution transmission electron microscopy (AC-HRTEM) image of 2 DPI (Inset: simulated image of 2 DPI along the [001] projection with the structure model overlaid: dots represent carbon, oxygen, nitrogen and hydrogen atoms, respectively). D) SAED pattern from the amorphous 2 DPI film synthesized at air-water interface without surfactants.

FIG. 6 shows structural characterization of 2DPA: A) 2DPA film measured by bright-field TEM. Dark regions are crystalline. B) SAED pattern from the crystalline domain in (A). The 100 and 010 reflections are at 0.65 $nm^{-1}$ and 0.52 $nm^{-1}$, respectively. C) AC-HRTEM image of 2DPA (Inset: simulated image of 2DPA along the [001] projection with the structure model overlaid: dots represent carbon, oxygen, nitrogen and hydrogen atoms, respectively).

FIG. 7 shows structural characterization of v2DPA: A) SAED pattern of v2DPA. The measured 120 and 001 reflections are at 1.29 $nm^{-1}$ and 1.05 $nm^{-1}$ with an angle of 80°. B) AC-HRTEM image of v2DPA showing the 001 lattice fringes.

FIG. 8 shows matrix-assisted laser desorption-ionisation (MALDI)-time-of-flight (TOF)-mass spectrometry (MS) for films containing vertical precursor formed by SA and monomer 5,10,15,20-(tetra(4-aminophenyl)) porphyrin (1). A) Chemical structure and molecular weight. B) MALDI-TOF spectrum of film formed by monomer 5,10,15,20-(tetra(4-aminophenyl)) porphyrin (1) under SA monolayer. Zoom-in range from 880 to 950 m/z.

FIG. 9 shows optical microscopy images of PANI films prepared with different surfactants: A) dihexadecyl phosphate, B) sodium oleyl sulfate, C) sodium dodecylbenzenesulfonate and D) without surfactant. All the films were prepared in 48 h reaction and 0.02 M HCl.

FIG. 10 shows structural characterization of q2D PANI single crystal: A) SAED pattern. B) AC-HRTEM image of q2D PANI along [001] axis. The 200 and 020 reflections are at 2.96 $nm^{-1}$ and 2.70 $nm^{-1}$, respectively (Inset: corresponding FFT).

FIG. 11 shows spectroscopic and electrical conductivity characterizations of q2D PANI: A) Thickness of q2D PANI vs. reaction time. B) Plot of 430 nm absorbance and corresponding transmittance of q2D PANIs from A). C) UV-Vis-NIR absorption of q2D PANI prepared at various HCl acid concentrations from 0.02 M to 1 M. D) Current (I)-Voltage (V) characteristic curves of q2D PANI from C), and in comparison to graphene-CVD.

FIG. 12 shows sensing responses of q2D PANI as ammonia and volatile organic compounds (VOCs) chemiresistor: A) Sensing response ($\Delta R/R_0$) of q2D PANI (1 M HCl) to different ammonia concentrations (30, 60, 90 and 120 ppb). B) Sensing response $\Delta R/R_0$ of q2D PANI (0.02 M HCl) chemiresistor to different heptanal concentrations (10, 20, 30, 40 and 50 ppm). C) Column diagram of sensor arrays to heptanal based on q2D PANI with various dopants (thickness; column): 0.02 M HCl (~5 nm; first); 0.02 M HCl (~9.3 nm; second); 0.005 M HCl (~9.3 nm; third); 0.02 M sulfuric acid (~9.3 nm; fourth); 0.02 M phytic acid (~9.3 nm; fifth); 0.02 M trifluoromethanesulfonic acid (~9.3 nm; sixth).

FORMATION OF A SURFACTANT MONOLAYER

20 μL sodium oleyl sulfate (SOS) (1 mg $ml^{-1}$ in chloroform) was spread onto the surface of 100 ml Milli-Q water in a 200-ml beaker. The mean molecular area (mma) is 24 $Å^2$, which can be calculated by $$mma = \frac{A_e M_w}{N_A m}$$

where $A_e$=25.12 $cm^2$, is the effective area; $M_w=M_{w,sos}$=370.5 g $mol^{-1}$, is the molecular weight of SOS; Na=6.02×$10^{23}$ $mol^{-1}$ is the Avogadro constant; and $m=m_{sos}$=20 μg, is the mass of surfactant. The mma of 24 $Å^2$ allows SOS molecules to form a monolayer as proved by π-A isotherm curve in FIG. 3A.

Similar to SOS, 15 μl stearic acid (SA, 1 mg $ml^{-1}$ in chloroform) was spread onto the interface between air and 100 ml Milli-Q water. The mma is 25 $Å^2$ that allows SA molecules to form a monolayer as proved by π-A isotherm curve in FIG. 3B.

Horizontal Synthesis of 2D Polyimide (2 DPI) on Water Surface

Figure 1A:
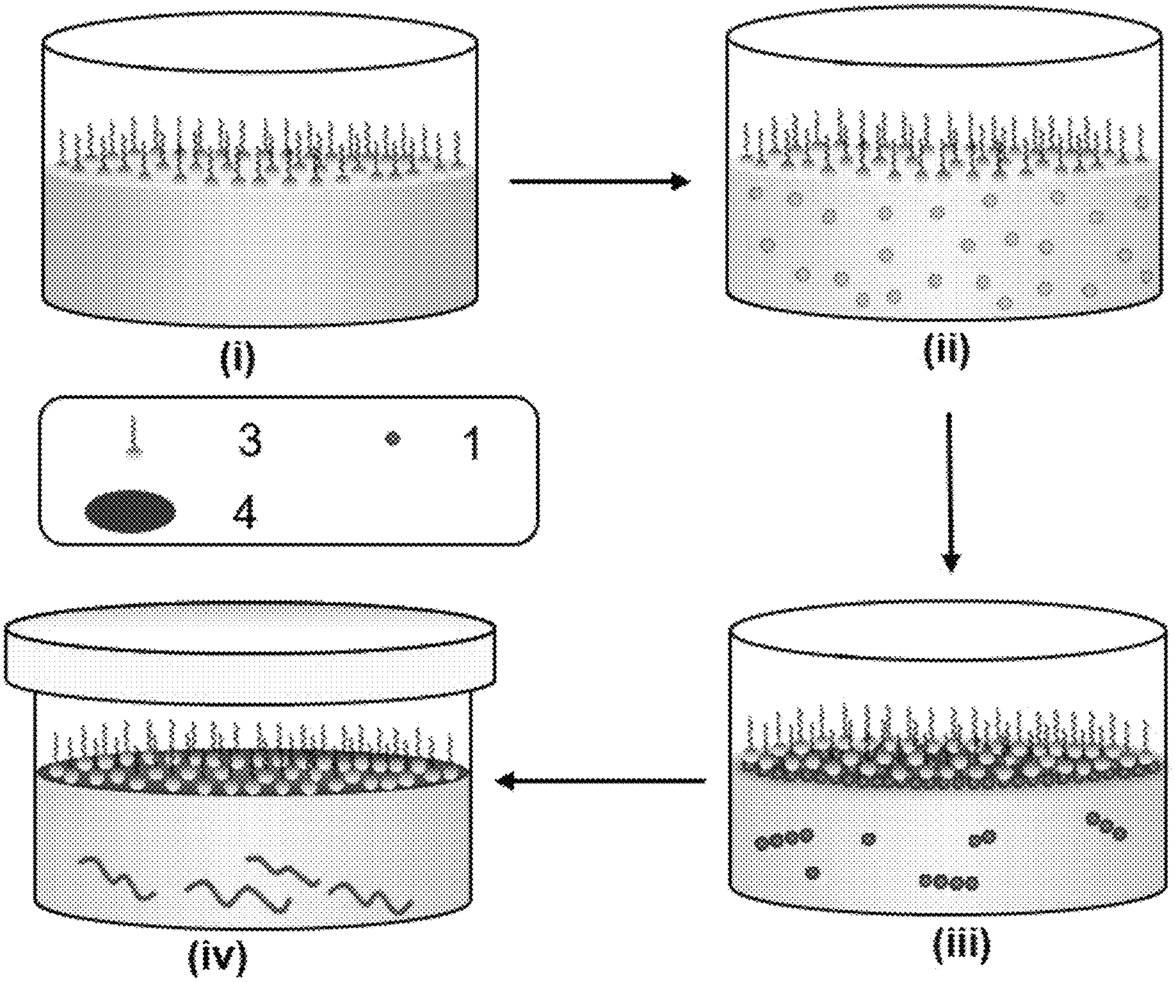
Figure 2:
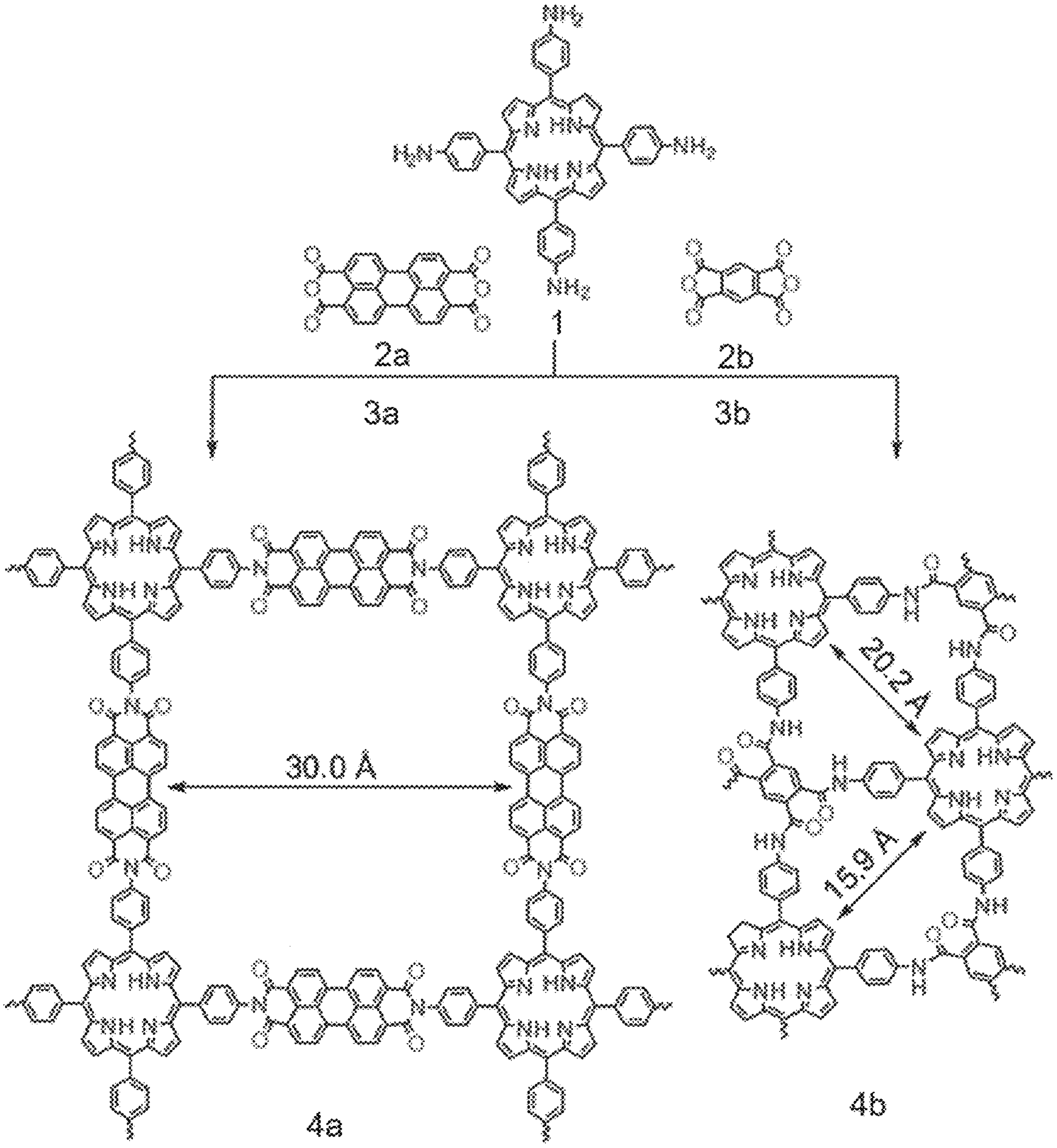
Figure 3A:
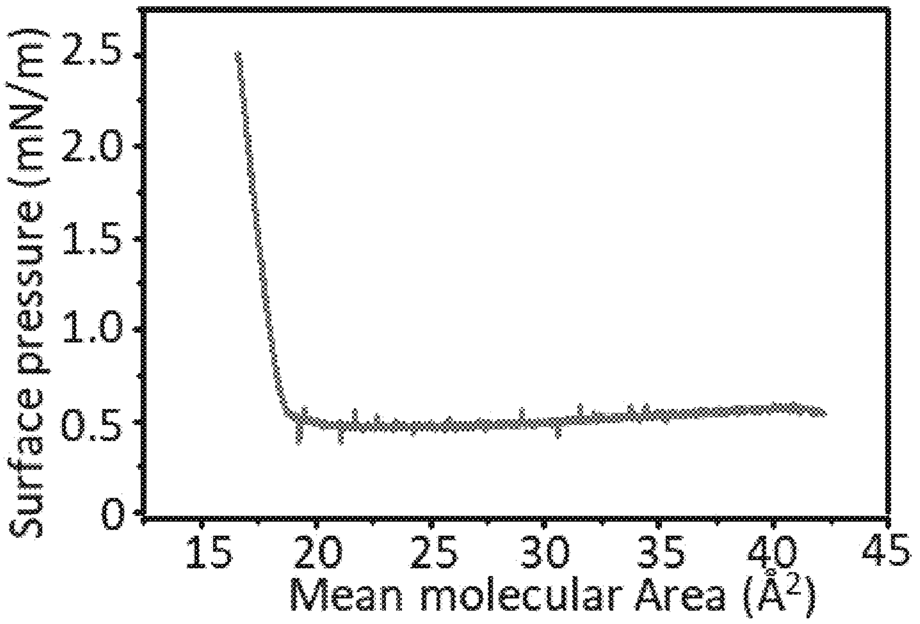
Figure 3B:
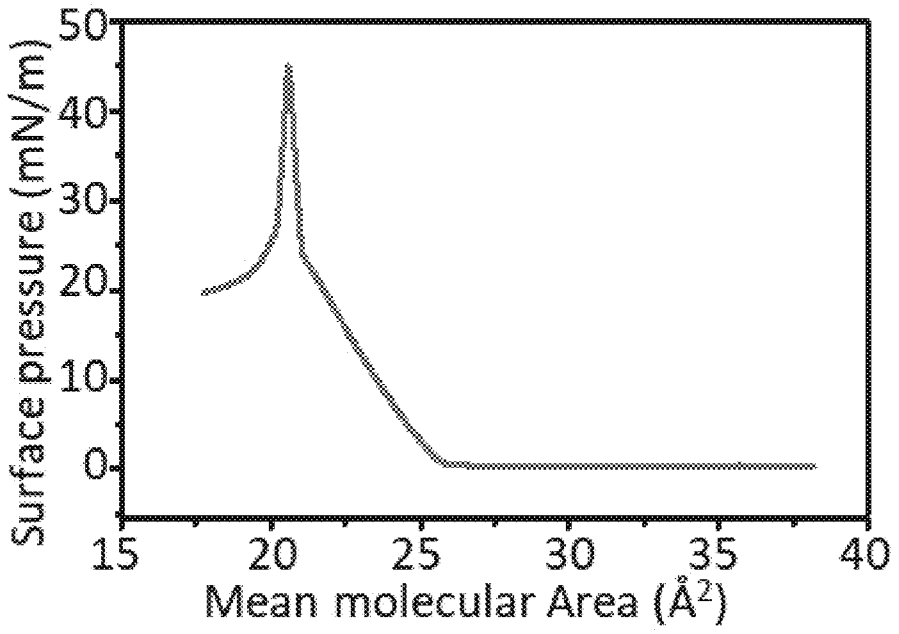

To synthesize 2 DPI, a monolayer of SOS was prepared (FIG. 1*a* (i)) on water, and then one monomer (5,10,15,20-(tetra(4-aminophenyl)) porphyrin, 1) was added (1.5×$10^{-7}$ mol) into the water phase (FIG. 1*a* (ii)). The adsorption and subsequent pre-organization of the monomer underneath the surfactant monolayer was facilitated by electrostatic interactions and hydrogen bonding (FIG. 1*a* (iii)). Next, a further monomer (isochromeno[4',5',6':6,5,10]anthra[2,1,9-def]isochromene-1,3,8,10-tetrone, 2a) (3.0×$10^{-7}$ mol) was injected into the water phase and then diffused to the pre-organized monomer where 2D polymerization was triggered on the water surface. The polycondensation reaction was left at 20° C. under ambient condition for 7 days, affording the few-layer 2 DPI crystals (FIG. 2). The formation of imide bonds in 2 DPI was confirmed by the Fourier transform infrared spectroscopy (FTIR) with the appearance of C═O characteristic peak (1695 $cm^{-1}$), as well as the elimination of N—H stretch ($v_{primary}$ amino, 3350 $cm^{-1}$) of the monomer and the C═O vibration ($v_{carboxylic\ dianhydride}$, 1755 $cm^{-1}$) of the further monomer (FIG. 3A). UV-Vis absorption spectrum of 2 DPI exhibited the characteristic Soret (S) band at 437 nm and Q band at 748 nm, which corresponded to the porphyrin structure in 2 DPI (FIG. 3B).

Structural Characterization

For structural characterizations, the polymer film was horizontally transferred onto 300 nm $SiO_2$/Si substrates for optical microscopy and atomic force microscopy (AFM), on quartz glass for UV-Vis absorption spectroscopy, on copper foil for infrared spectroscopy (IR), and holey copper grids for TEM characterizations.

Mass spectrometry analysis was performed on a Bruker Autoflex Speed MALDI TOF MS (Bruker Daltonics, Bremen, Germany) using dithranol as matrix. Optical images were acquired in differential interference mode with AxioScope A1, Zeiss. AFM was performed in air on a-customized Ntegra Aura/Spectra from NT-MDT (Moscow, Russia) with a SMENA head operated in contact mode. AC-HRTEM imaging and SAED were conducted on an image-side Cs-corrected FEI Titan 80-300 microscope operated at 300 kV. In order to reduce the electron irradiation damage on the polymer films, the total electron dose for the acquisition of SAED patterns and HRTEM images was limited to 2.0 $e^-/Å^2$ (dose rate: 0.2 $e^-/Å^2$) and 1000 $e^-/Å^2$ (dose rate: 200 $e^-/Å^2$), respectively. UV-Vis absorption spectra were obtained on an UV-Vis-NIR Spectrophotometer Cary 5000 at room temperature. Fourier-transform infrared spectroscopy (FTIR) was performed on Tensor II (Bruker) with an attenuated total reflection (ATR) unit.

After removing the surfactant with chloroform, the film remains stable and homogeneous. AFM measurements on the $SiO_2$/Si wafer show a film thickness of ~2 nm, corresponding to ~5 layers. When transferred onto a holey copper grid, the film freely suspends over the hexagonal mesh with a side length of ~25 μm.

Figure 4A:
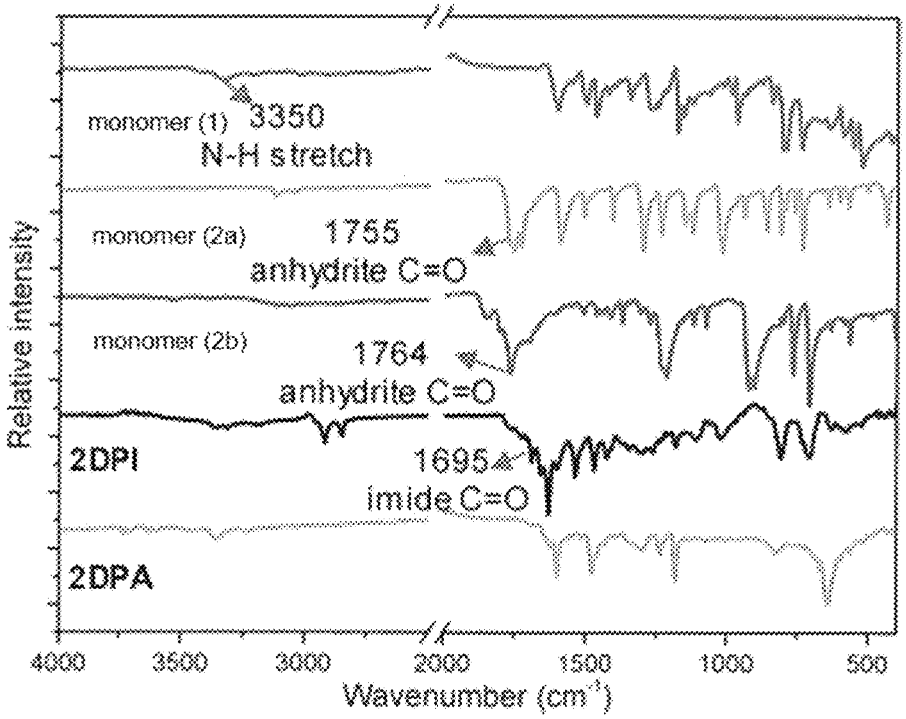
Figure 4B:
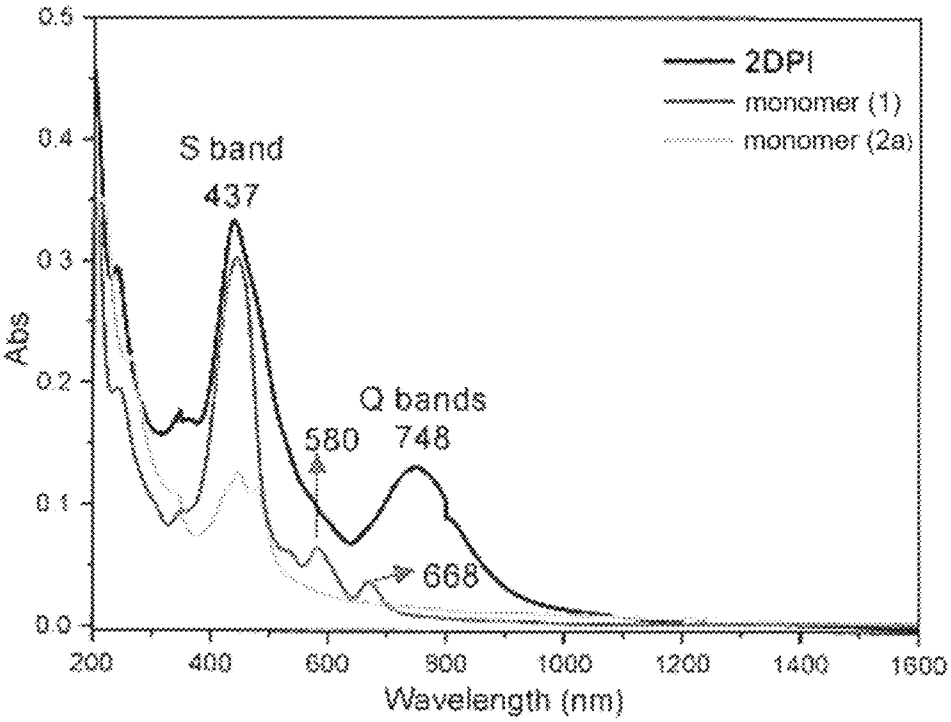

Bright-field TEM shows that the polymer crystals (dark) are bridged by amorphous areas (bright) in the thin film (FIG. 4A). The areal ratio between the crystalline and amorphous regions is ~2.2, which indicates that 69% of the tested area is crystalline. In addition, the 2 DPI film was deposited on a silicon substrate and chemical exfoliation was carried out in dichloromethane via sonication. After exfoliation, the 2 DPI film shows step-like structure at the edge of the crystalline domains. AFM measurements reveal step heights of 0.4±0.10 nm and 0.7±0.1 nm within different regions, which can be assigned to the thickness of monolayer and bilayers, respectively.

Figure 4C:
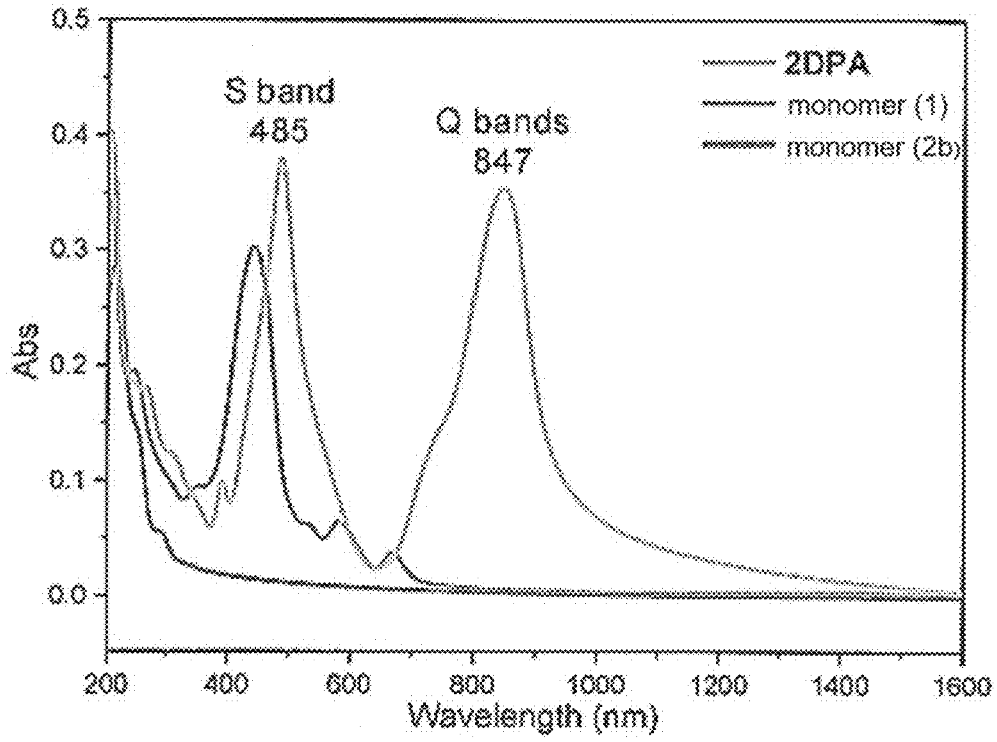

Selected-area electron diffraction performed on the free-standing 2 DPI film reveals a square unit cell with a=b=30.0 Å, agreeing with the slipped AA-stacked atomic model of 2 DPI derived by density-functional tight-binding (DFTB) calculation (FIG. 4C).

The molecular structure of 2 DPI was visualized by AC-HRTEM (FIG. 4C), showing the square lattice with 30.0 Å spacing. Based on AC-HRTEM image simulation (inset, FIG. 4C), the darkest part corresponds to the pores between the porphyrin units. To address the crystallinity of 2 DPI, selected area electron diffraction (SAED) was performed at various positions on 3 mm×3 mm sized grids. All the diffraction patterns in each selected grain are identical, demonstrating that each domain is a single crystal. The average domain size is ~3.5 $μm^2$, corresponding to a structurally defined 2D polymer with a molecular weight (MW) of ~5.4×$10^8$ g $mol^{-1}$.

The edge structure of the 2 DPI domains were characterized using the AC-HRTEM image. FIG. 2A shows regions, where two crystalline domains are bridged by amorphous fragments. By comparing the AC-HRTEM image with its fast Fourier transform (FFT) patterns, the domain edges were found to be parallel to the (100) and (010) planes of 2DPI.

Horizontal Synthesis of 2 DPI on Water Surface without Surfactant (Reference Example)

The synthesis of 2 DPI was carried out as described above without a surfactant. Only amorphous films were obtained (FIG. 4D).

Horizontal Synthesis of 2 DPI on Water Surface with Further Surfactants

The synthesis of 2 DPI was carried out as described above with the surfactants sodium dodecylbenzenesulfonate (SDBS). SDBS functions similar to SOS, which can guide the self-assembly of the monomer (1) via electrostatic interaction, thus leading to the formation of 2 DPI crystals.

Horizontal Synthesis of 2D Polyamide (2DPA) on Water Surface

The synthesis of 2DPA crystals by polymerization of a monomer (5,10,15,20-(tetra(4-aminophenyl)) porphyrin, 1) and a further monomer (1H,3H-Furo[3,4-f][2]benzofuran-1,3,5,7-tetrone, 2b) at a SOS-water interface was carried out under identical synthesis conditions as the synthesis of 2DPI.

A crystalline 2D polymer was obtained with a dual-pore structure (FIG. 2) and a thickness of ~10 nm. FTIR results confirmed the formation of polyamide with C═O stretch of amide at 1660 $cm^{-1}$ and N—H stretch at 1335 $cm^{-1}$ (FIG. 3A). UV-Vis absorption spectrum of 2DPA also presented the characteristic Soret (S) and Q bands of the porphyrin units at 485 nm and 847 nm, respectively (FIG. 3C). The average crystalline domains of 2DPA exhibit a width of 0.1-0.2 μm and a length of up to 2 μm. The areal ratio between the crystalline and amorphous region is ~1.9, suggesting that 66% polyamide film is crystalline.

Figure 5:
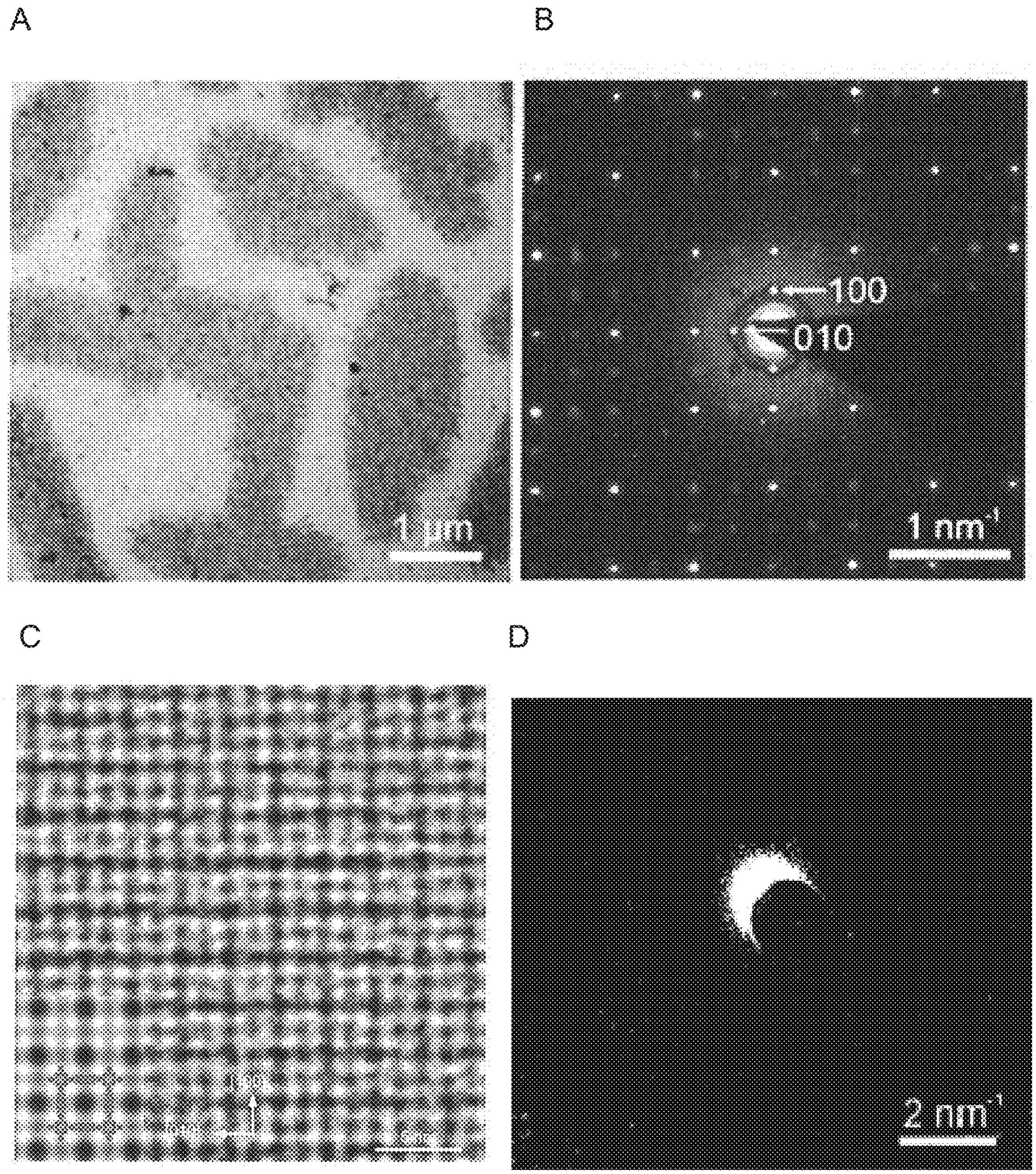

The edge of crystal domain of 2DPA shows a layer-by-layer stacking morphology. The SAED pattern shows first order reflections at 0.52 $nm^{-1}$ and 0.65 $nm^{-1}$ (FIG. 5B), corresponding to a rectangular unit cell with lattice constants of a=15.4 Å and b=19.2 Å, respectively, which agrees with DFTB calculations. The crystal structure was further confirmed by AC-HRTEM, in which the darkest parts represent the larger pores of 2DPA (FIG. 5C). Similar to 2 DPI, the monomer in the 2DPA crystal has face-011 orientation and extends horizontally on the water surface. The grain elongates in [100] direction. The higher growth rate along [100] axis has been attributed to the trivial mismatch between the lattice parameters of 2DPA (a=15.4 Å) and pre-H (15.0 Å), which favours the crystal growth over that in [010] direction.

Vertical Synthesis of 2DPA in Water

For the vertical synthesis of 2DPA in water, the synthesis was carried out under identical synthesis conditions as the horizontal synthesis of 2DPA. However, stearic acid (SA) was employed as surfactant, whose carboxyl group can react with one amine group of the monomer 5,10,15,20-(tetra(4-aminophenyl)) porphyrin (1), forming a covalent amide bond at the air-water interface, experimentally verified by MALDI-TOF-MS (FIG. 7).

Figure 7:
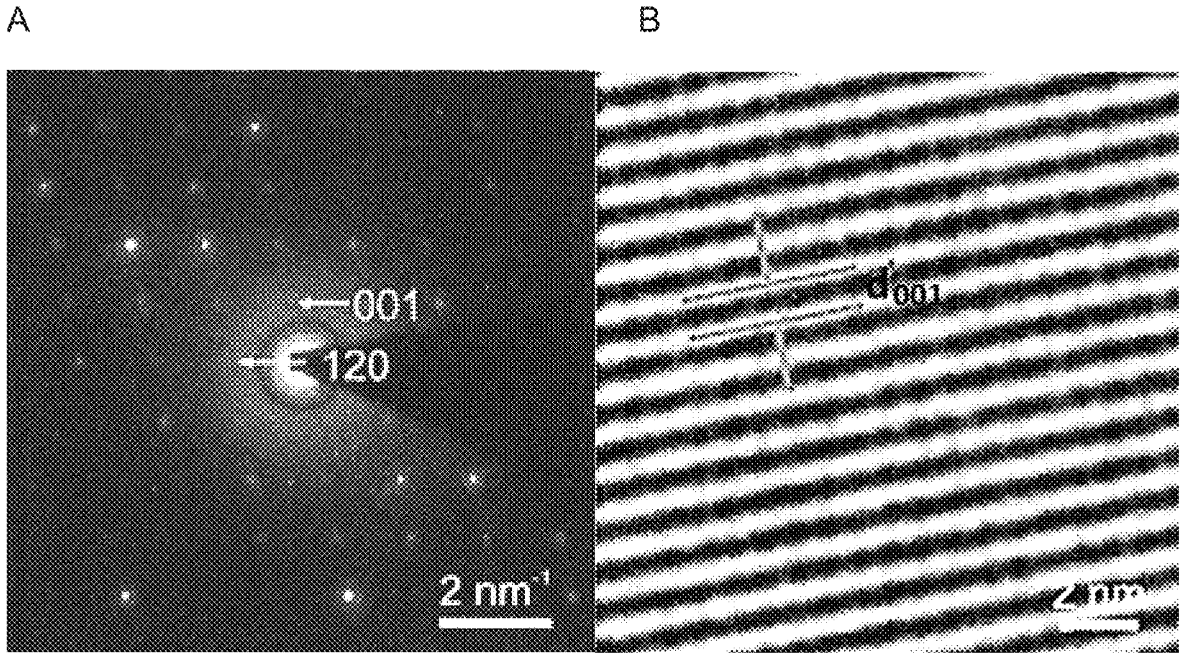

FIG. 7 shows the target molecule with 940 m/z, which is assigned to the monomer bonded with SA by forming amide bond (chemical formula: $C_{62}H_{68}N_8O$). The peaks at 925 m/z, 912 m/z and 898 m/z correspond to fragments of amide molecules after losing one, two, and three —$NH_2$ groups, due to the decomposition during ionization process, respectively.

Consequently, the monomer could be vertically anchored under the SA monolayer as precursor (namely, pre-V). In contrast to pre-H, grazing-incidence wide-angle X-ray scattering (GIWAXS) measurement of pre-V shows an intensive π-π stacking peak along the in-plane direction (data not shown), demonstrating the edge-on arrangement of the monomer, which allows for the 2D polymerization along the vertical direction.

Figure 6:
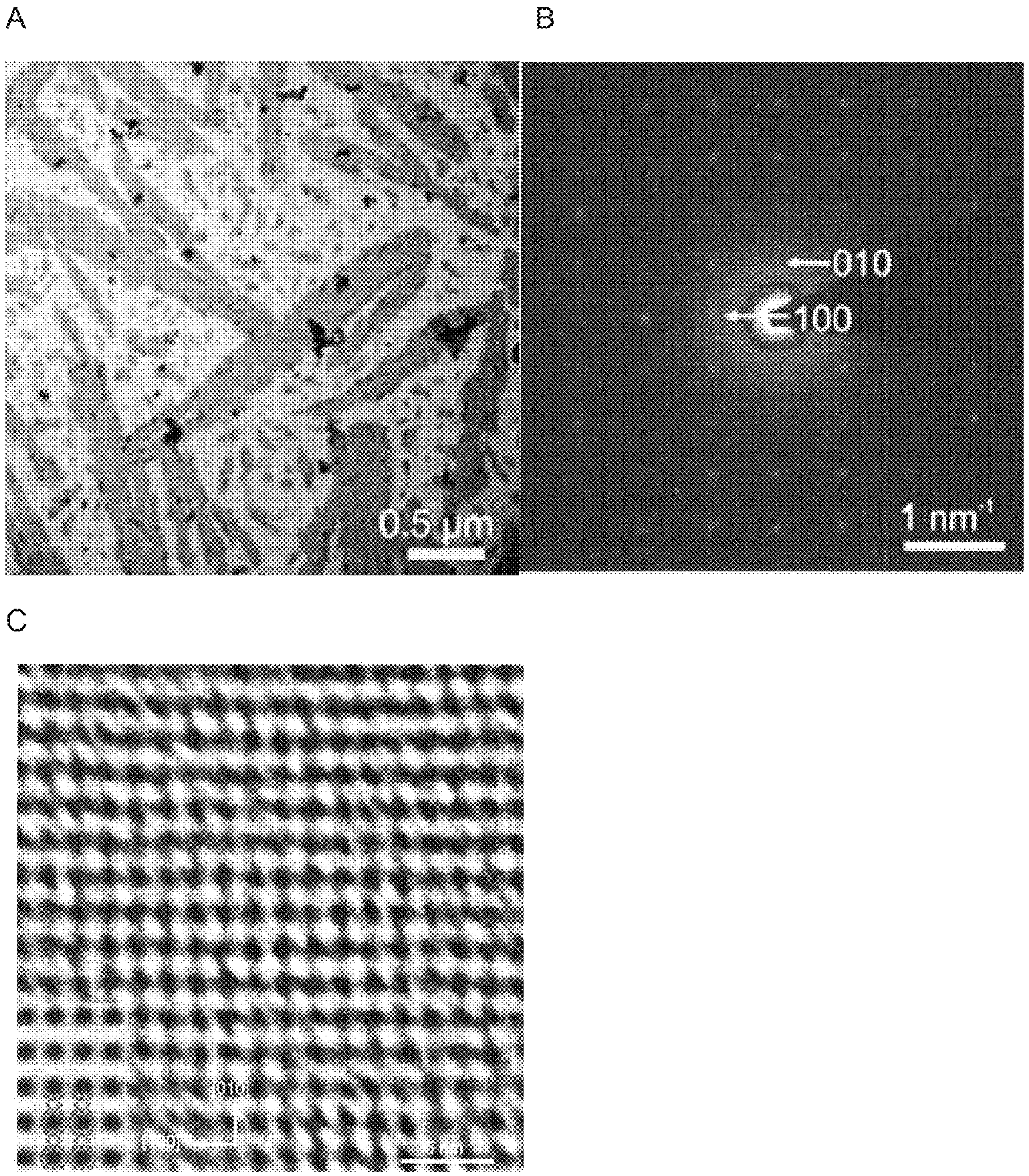

As expected, the GIWAXS pattern has confirmed that, the growth direction of 2DPA layers has been adjusted from horizontal to vertical (v2DPA). The presence of 001 reflection in SAED pattern (FIG. 6A) and 001 lattice fringes in AC-HRTEM image (FIG. 6B) further confirmed the edge-on configuration of 2DPA layers. AFM reveals that v2DPA has lamellar morphology and a layer step height of ~1.8 nm. The crystallinity of v2DPA is significantly higher than that of 2DPA. No amorphous fragments could be identified within v2DPA over 3 mm×3 mm sized grids, and the crystal domain size of v2DPA is as large as ~121 $\mu m^2$ without significant variation of the in-plane crystallographic orientations.

Synthesis of Quasi-Two-Dimensional (q2D) Polyaniline (PANI)

Figure 1B:
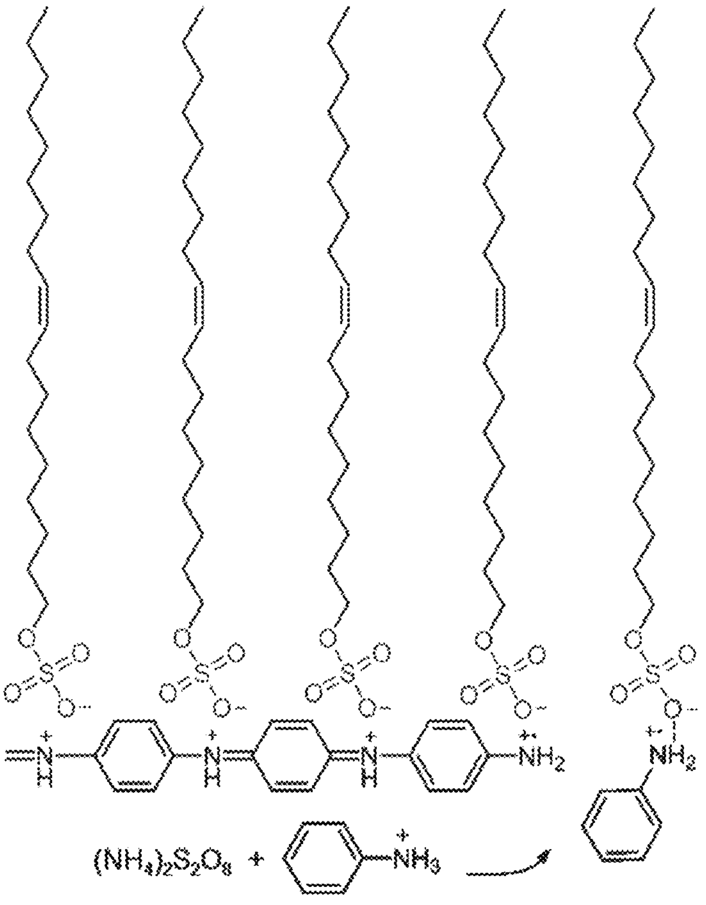
Figure 1C:
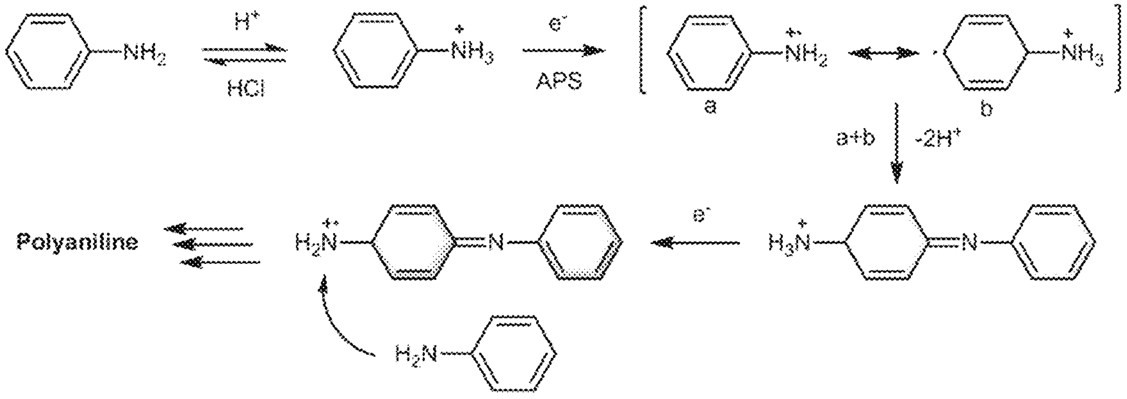

The q2D PANI film was synthesized via an oxidative polymerization of aniline monomers at the air-water interface with the assistance of a surfactant monolayer. The synthesis procedure is schematically illustrated in FIG. 1A. For the preparation of the surfactant monolayer 10 μl of a solution of sodium oleyl sulfate dissolved in chloroform (1 mg $ml^{-1}$) and filtered by PFTE syringe filter (0.2 μm, 1-15 ml, ThermoFisher), were spread on the water surface (50 ml) in a glass well with a diameter of 6 cm, wherein chloroform was allowed to evaporate for 30 minutes. Following, the aniline monomers (1 ml 1.5 μM in water) was added in the water subphase using a pipette. The glass well was then covered with a petri dish and kept for ~24 h, allowing aniline monomers to diffuse and adsorb underneath the surfactant monolayer. Afterwards, 1 ml 1 M hydrochloric acid and ammonium persulfate (APS, 10 mg in 1 ml water) were added sequentially into the subphase triggering the oxidative polymerization of aniline at 1° C. (FIGS. 1B and C). The solution turned eventually dark green after several hours, indicating the successful polymerization of aniline monomers into PANI. q2D PANI subsequently appeared on the water surface.

Low concentration of monomer and catalyst (APS) slows down the polymerization, which can be favourable for the formation of ultra-thin PANI films with high crystallinity. After ~48 h polymerization, a uniform and continuous q2D PANI film was obtained on the water surface.

Before characterization, the q2D PANI films on substrates were rinsed for ca. 1 h with chloroform (20 mL) and ethanol (20 mL), respectively.

Synthesis of q2D PANI with Further Surfactants

Various surfactants were investigated in the synthesis of q2D PANI. All the films were prepared in 48 h reaction and 0.02 M HCl. The anionic surfactants dihexadecyl phosphate (FIG. 8A), sodium oleyl sulfate (FIG. 8B) and sodium dodecylbenzenesulfonate (FIG. 8C) produce large-area continuous and uniform PANI films, investigated by optical microscopy. Moreover, applying sulfate ions headed surfactants (sodium oleyl sulfate and sodium dodecylbenzene-sulfonate) affords q2D PANI films with excellent morphological homogeneity without cracks and pinholes. This can be attributed to the highest negative charge density of the sulfate groups, which facilitates the electrostatic interaction with aniline monomers.

Synthesis of q2D PANI without Surfactant (Reference Example)

Figure 8:
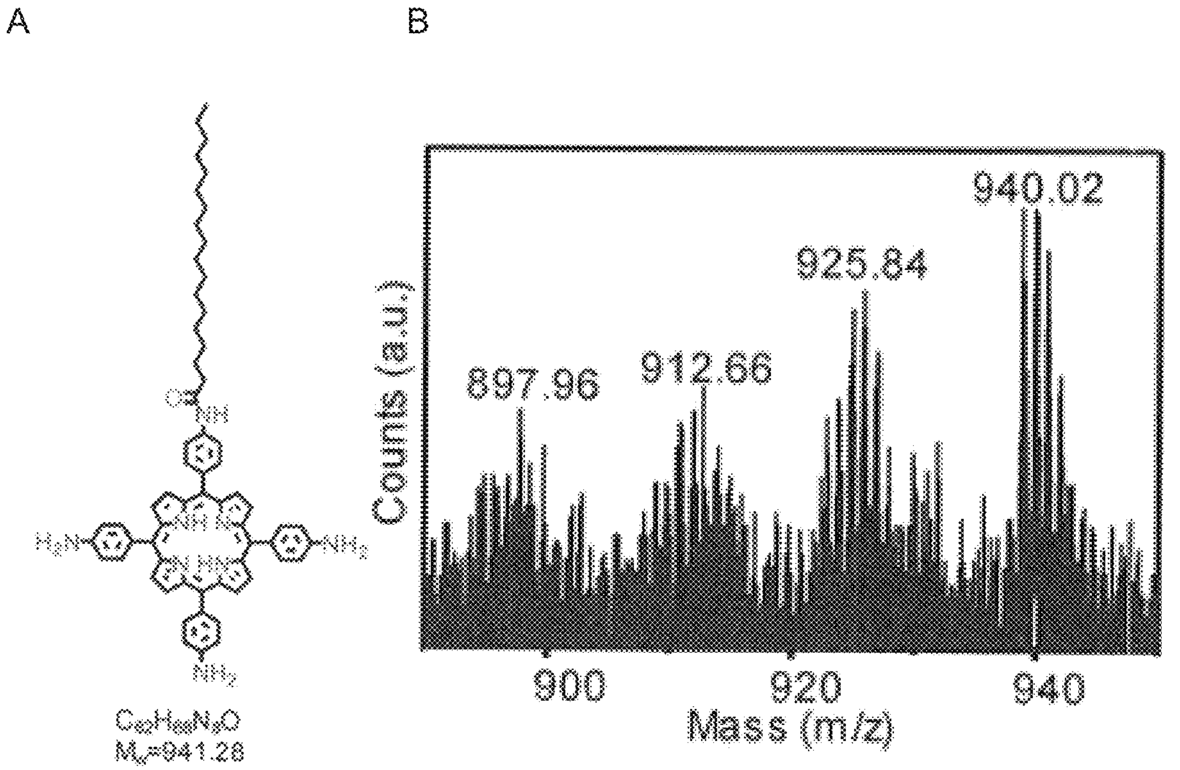

The synthesis of q2D PANI was carried out as described above without a surfactant. Only fibrous PANI was obtained (FIG. 8D).

Structural Characterization of the q2D PANI Film

To transfer the q2D PANI film, a solid substrate was placed under the floating film and the water subphase was removed gently until the film fell onto the substrate surface. Q2D PANI film with a diameter of ~8 cm was transferred onto a 300 nm thick $SiO_2$/Si wafer (diameter 0=10 cm). Under optical microscope, the q2D PANI is uniform, and the edges of the film are clearly visible. The q2D PANI can span large holes with edges of ~20 μm on a copper TEM grid, suggesting a high mechanical stability. AFM measurement at film edges by stochastic sampling reveals an average thickness of ~9.3 nm after 48 h of polymerization. The thickness is nearly identical at different positions, and the root mean square (RMS) roughness of selected area (5×5 μm$^2$) is 0.3 nm, indicating excellent morphological homogeneity of the q2D PANI film.

Figure 9:
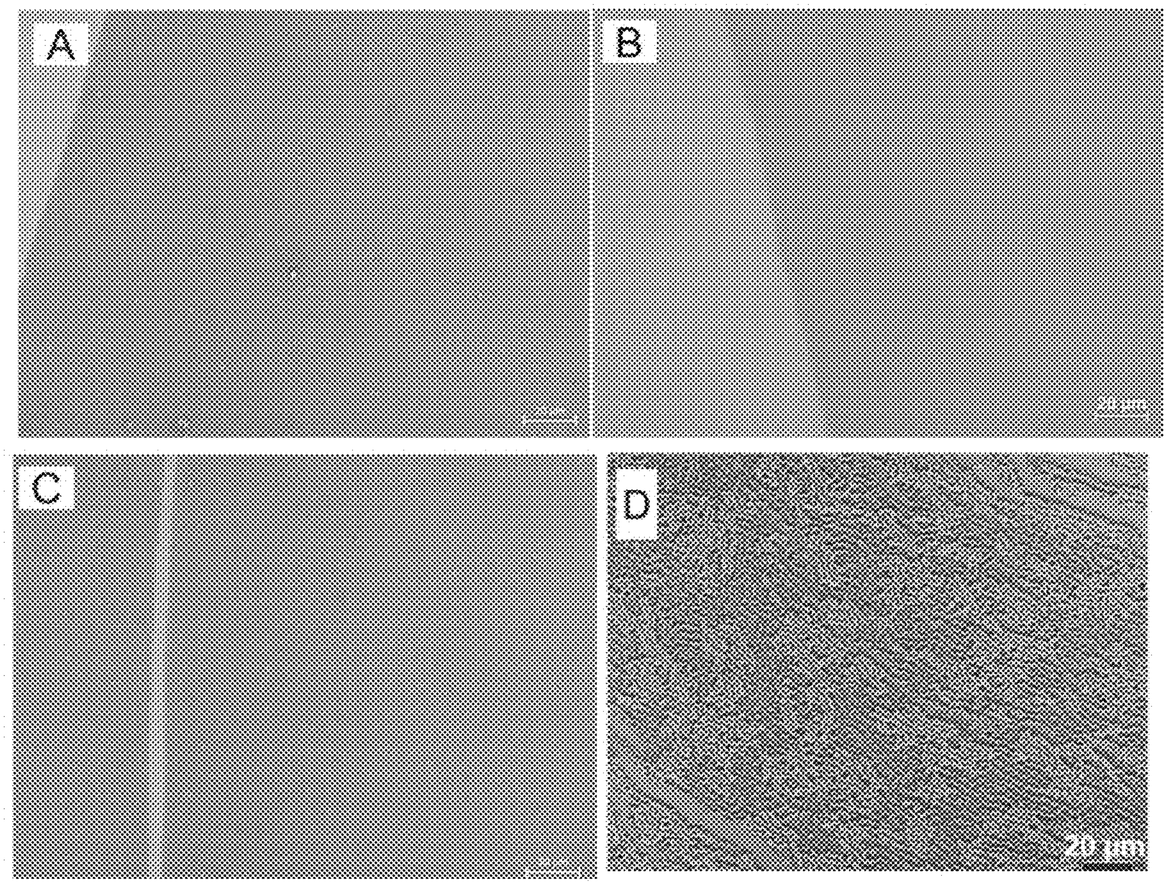

The statistical value of single crystal domain size derived by SAED is 1.1-1.5 μm (i.e. 1.2-2.3 μm$^2$) and the largest crystalline domain size is beyond 2.3 μm (i.e. ~5.2 μm$^2$). As shown in FIG. 9, the linear polymer chains align parallel to each other, packing into a quasi-two-dimensional molecular sheet. Unlike polymers obtained by solution synthesis, the PANI chains in the molecular sheet exhibit excellent long range order, showing no chain folding or any entanglement. Since the average single crystal size of q2D PANI is 1.1-1.5 μm, we estimate that the length of the PANI chains in each crystal reaches the same scale, corresponding to ~$10^6$ monomer units and ~$10^8$ g mol$^{-1}$ molecular weight in a single PANI chain.

Thickness Control and Spectroscopic Characterization of the q2D PANI Film

The q2D PANI formation is confined at the surfactant-water interface, in which the monomers in the water subphase continuously transport to the interface for oxidative polymerization. Therefore, extending the reaction time leads to a higher monomer conversion, corresponding to an increase in film thickness. As revealed in FIG. 10A, the thickness of q2D PANI increased with a constant rate of 5 nm per day (in 0.02 M HCl) in the first five days, then levelled around 30 nm after seven days when all monomers were consumed.

The film crystallinity improved substantially with increasing thickness, and the crystal structure remained identical. The thickness of the thinnest q2D PANI film was 2.6±0.4 nm (after a 12 h reaction), corresponding to two molecular layers (one layer is ~1.3 nm according to the SAED and GIWAXS results).

Figure 10:
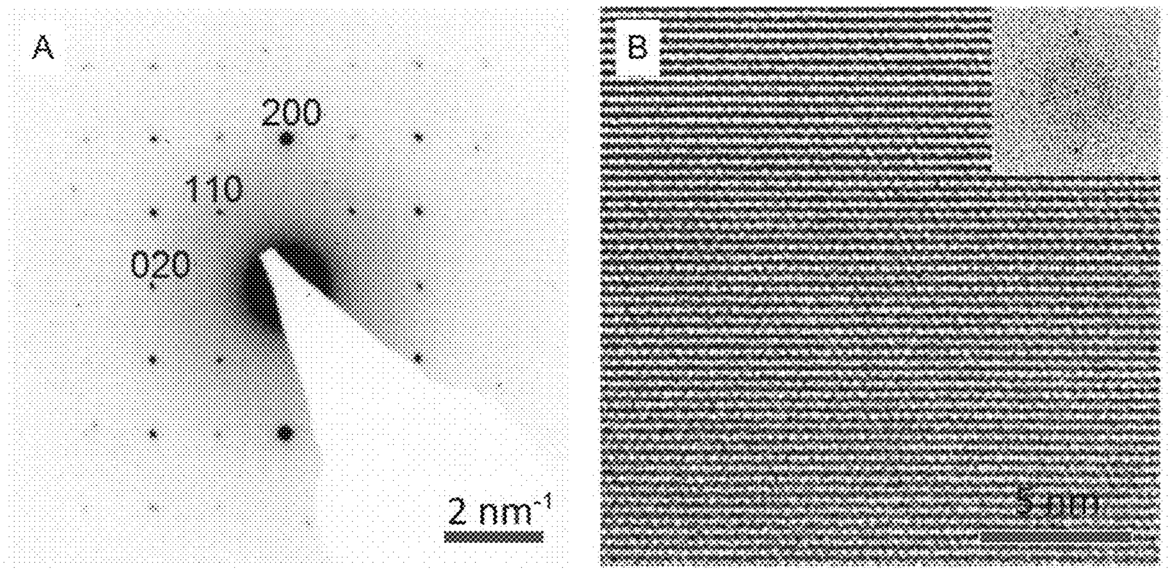

From ultraviolet-visible-near-infrared (UV-Vis-NIR) spectra, the q2D PANI presents the characteristic absorbance at 430 nm (polaron-π*), which shows a linear correlation with reaction time in the initial five days (FIG. 10B), and follows the Beer-Lambert law. The transmittance of q2D PANI decreases with reaction time (FIG. 10B). Nevertheless, ~90% of transmittance can still be observed on the q2D PANI after 7 days of reaction (ca. 30 nm thick), which can be attributed to the excellent chain ordering that reduces light scattering.

In order to increase the doping level of q2D PANI, the acid concentration (hydrochloric acid) was increased to 1 M during polymerization (FIG. 10C). Using 1M hydrochloric acid a longer induction period (ca. 12 h) was observed and the polymerization speed decreased to 4.2 nm per day. By increasing the HCl concertation of water subphase from 0.02 to 1 M, we can identify a monotonic rise in the absorbance at 360 nm (π-π* transition of the benzenoid ring) and above 600 nm (free-carrier absorption) (FIG. 10C), which are characteristics of the doped form of PANI (emeraldine-salt) and beneficial for achieving high electrical conductivity.

Conductivity Measurement of the q2D PANI Film

The electrical conductivity of the q2D PANI films was measured by two-probe (lateral conductivity) and current-sensing AFM (vertical conductivity), respectively. The corresponding I-V curves along both directions indicate an ohmic contact between ~0.5 V and +0.5 V, which reveal a lateral conductivity of 8.7×10$^{-3}$ S cm$^{-1}$ and a vertical conductivity of 5.0×10$^{-5}$ S cm$^{-1}$ in a 9.3-nm-thick q2D PANI film doped by 0.02 M HCl. The superior lateral conductivity ascribes to the long-range ordered and expanded-coil conformation of PANI chains along the in-plane direction, which enhances hopping transport between adjacent PANI chains.

When the doped acid concentrations of subphase increased from 0.02 M to 1 M, the corresponding lateral conductivity of q2D PANI increased to 23 S cm$^{-1}$ (FIG. 10D). The I-V current (0.69 mA at 50 mV) of q2D PANI doped with 1 M HCl is even superior to the commercial graphene (0.61 mA at 50 mV) synthesized by chemical vapor deposition. The conductivity of q2D PANI increased to 160 S cm$^{-1}$ by additional doping using HCl vapor. This conductivity of the q2D PANI largely surpasses those of PANI thin films of low crystallinity.

Chemical Sensing Using the q2D PANI Film

Figure 11:
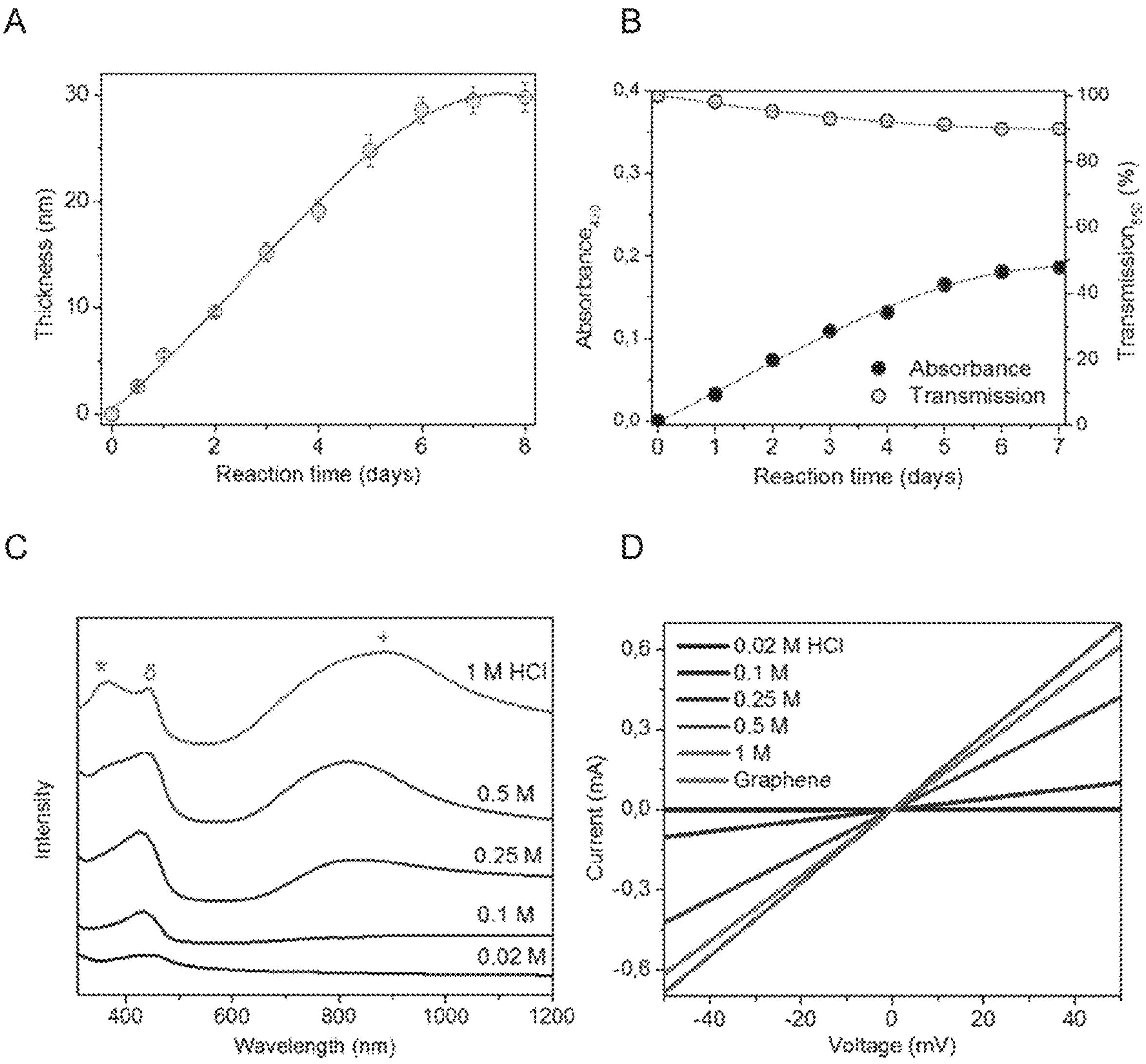
Figure 12:
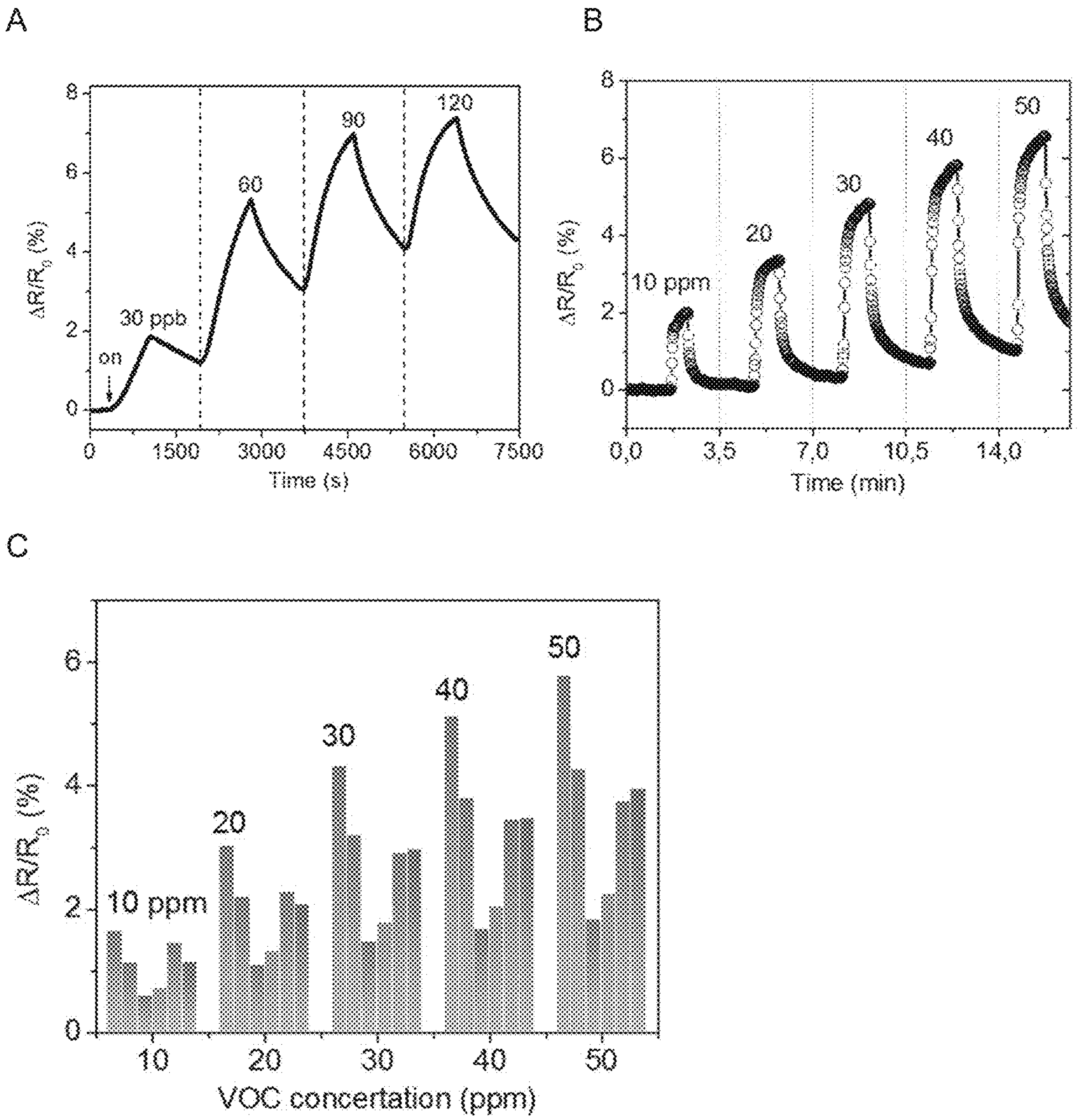

Owing to their ultra-thinness and wide range adjustability of electrical conductivity (e.g., upon exposure to acid, alkali and polar compounds), the q2D PANI is a promising electrode material for chemical sensing. The performance of q2D PANI in $NH_3$ sensing was firstly assessed through a chemiresistor-type gas sensor, which was fabricated through transferring a 9.3-nm-thick q2D PANI onto $SiO_2$ substrate covered with Au electrodes. FIG. 11A shows the normalized sensing response ΔR/R0 to successive exposures to $NH_3$ with concentrations ranging from 15 to 120 ppb under room temperature. In all tested devices, a decrease of current (an increase of resistance) upon $NH_3$ exposure was observed, which is due to the deprotonation of q2D PANI by $NH_3$. The lowest detection limit (defined as the concentration providing a signal-to-noise ratio of at least 3) was 30 ppb, lower than the most reported PANI sensors. Such sensitivity is even better than nitrogen- and boron-doped carbon nanotubes (100 ppb) at identical testing conditions (Wang et al. 2012), and relevant for diagnosis of certain diseases such as liver cirrhosis, kidney failure, and diseases caused by *Helicobacter pylori*. The high performance of q2D PANI in $NH_3$ sensing can be attributed to its ultra-thinness with the sufficient exposure of activity sites as well as long-range ordered chain structures that provide efficient pathways for the diffusion of $NH_3$ molecules (~1.2 Å).

Next, the application of q2D PANI film in clinical related chemiresistors was evaluated by exposure to volatile organic compounds (VOCs). Heptanal, as a representative VOCs, has been detected in blood, breath, and urine samples, and thus could serve as a biomarker for disease diagnosis and health monitoring. FIG. 11B displays the sensing characteristics of the 5-nm-thick q2D PANI based chemiresistor, which reveals extremely fast response after exposure to heptanal vapour and the excellent reversibility when flushed with dry nitrogen. The electrical resistance of the chemiresistor increases with the rise of heptanal concentrations (from 10 to 50 ppm), which is likely caused by the swelling of q2D PANI from the heptanal adsorption. The weak binding between VOCs and q2D PANI ensures a reversible (peak-like) resistance response in sensing. In addition, sensitivity can be modulated by various doping acids as well as the film thickness (FIG. 11C). Overall, the ~2% ΔR/R0 (at 10 ppm) of q2D PANI exceeds the state-of-art PANI based devices (~1.7% at 25 ppm) (Deng et al. 2018), and is sufficient to detect the VOCs released from patients (~205.5 ppm) and healthy controls (~22.8 ppm).

TABLE 1

Synthesis of 2D and q2D polymer films according to the invention in water via copolymerisation according to the synthesis of 2DPI, 2DPA or v2DPA with the surfactant (9Z)-octadec-9-en-1-yl sulfate (SOS), sodium 4-dodecyl benzene sulfonate (SDBS), triethanol ammonium dihexadecylphosphate (DHP), oleic acid (OA), hexadecyl trimethylammonium bromide (CTAB) or octadecanoic acid (SA).

| Reaction type | Monomer 1 | Monomer 2 | Target Polymer | Surfactants |
| --- | --- | --- | --- | --- |
| Boronic ester condensation | 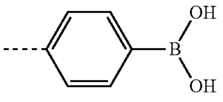 | 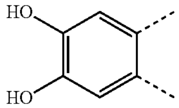 | 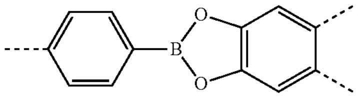 | SOS, SDBS, DHP, OA |
| Imine condensation | 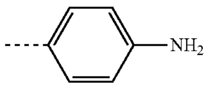 | 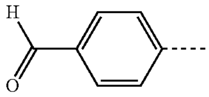 | 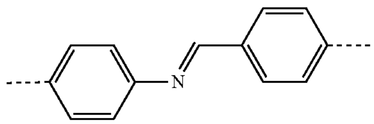 | SOS, SDBS, DHP, OA |
| Hydrazone condensation | 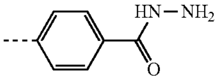 | 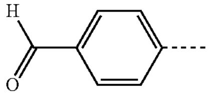 | 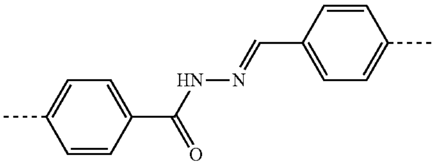 | SOS, SDBS, DHP, OA |
| Azine condensation | 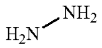 | 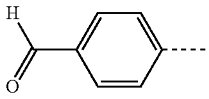 | 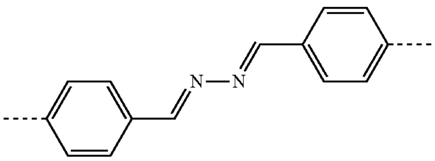 | SOS, SDBS, DHP, OA |
| β-Ketoenamine condensation | 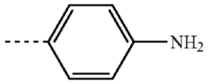 | 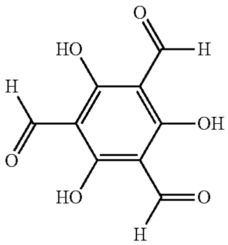 [SMILES: O=Cc1c(O)c(C=O)c(O)c(C=O)c1O] | 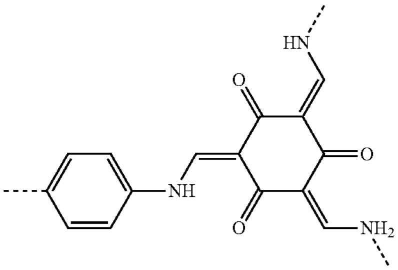 | SOS, SDBS, DHP, OA |
| β-Ketoenamine condensation | 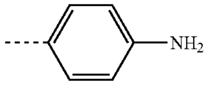 | 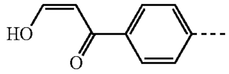 | 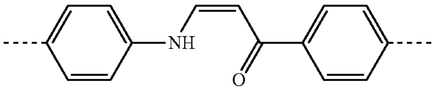 | SOS, SDBS, DHP, OA, CTAB |
| Imide condensation | 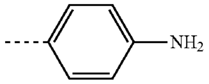 | 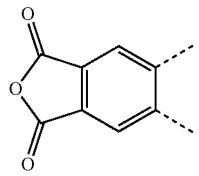 | 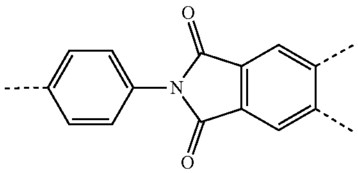 | SOS, SDBS, DHP |
| Amide condensation | 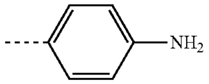 | 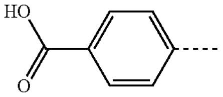 | 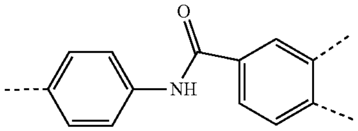 | SOS, SDBS, DHP, SA, CTAB |

TABLE 2

Synthesis of 2D and q2D polymer films according to the invention in water via homopolymerisation according to the synthesis of q2D PANI with the surfactant triethanol ammonium dihexadecylphosphate (DHP).

| Reaction type | Monomer 1 | Target polymer | Surfactants |
|---|---|---|---|
| Glaser coupling | 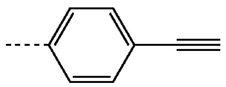 | 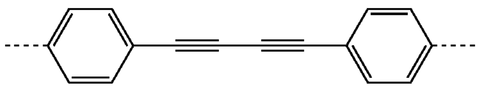 | DHP* |
| Ullmann coupling | 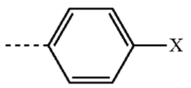 X = I or Br | 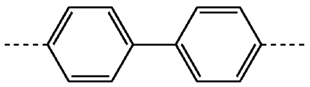 | DHP |

Horizontal Synthesis of 2D Boronate Esters on Water Surface

Figure 13:
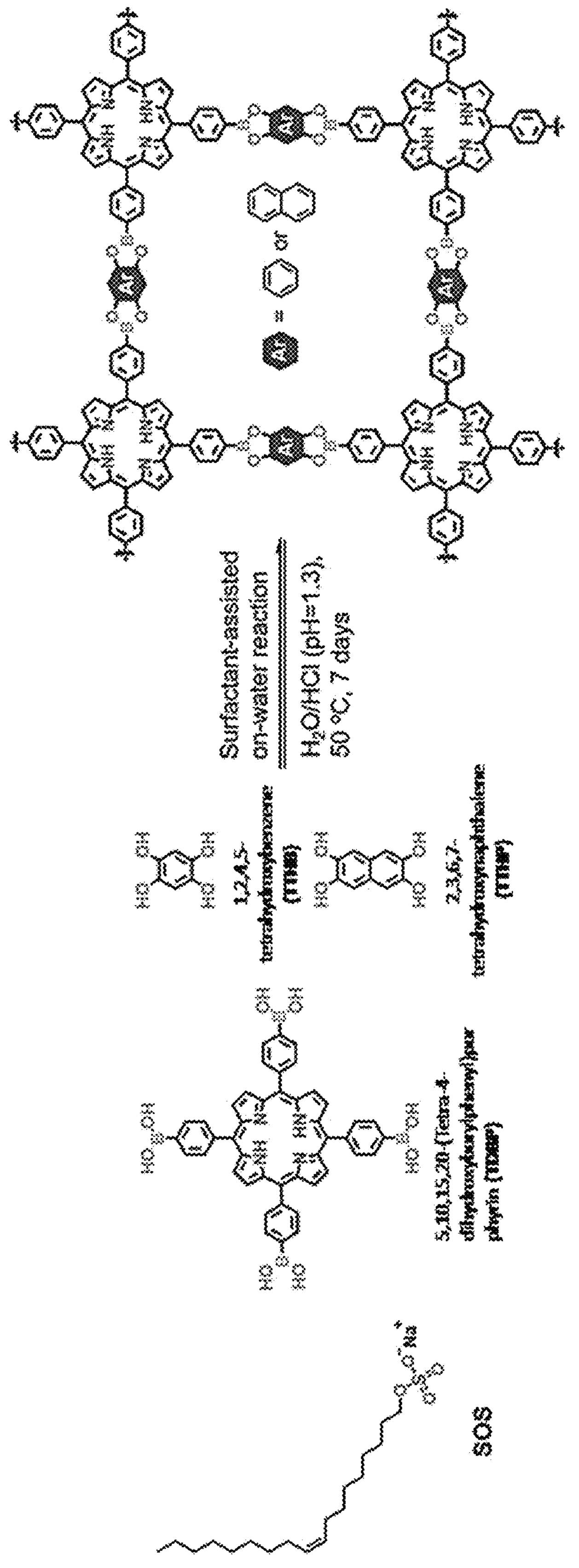
FIG. 13 shows a reaction scheme of the synthesis of boronate ester linked 2D polymer films using the method according to the invention.

FIG. 13 illustrates the interfacial synthesis procedure of the 2D boronate ester according to the invention. Specifically, a chloroform solution of SOS surfactant was dropped onto the water surface and a SOS monolayer was achieved with the $RSO_4^-$ polar head groups facing the water phase after the evaporation of chloroform. Subsequently, 1 ml of acidic aqueous solution comprising 5,10,15,20-(Tetra-4-dihydroxyborylphenyl)porphyrin (TDBP) (1 μmol) and HCl (1 mmol) was injected into the 40 ml water phase. Due to the electrostatic interactions between protonated porphyrin of TDBP and the $RSO_4^-$ head groups of SOS, TDBP was readily adsorbed underneath the SOS monolayer. Next, 1 ml of acidic aqueous solution comprising 1,2,4,5-tetrahydroxybenzene (TTHB) (4 μmol) and HCl (1 mmol) was added into the water phase and then diffused to the pre-adsorbed TDBP. The mixed solution (pH 1.3) was treated at 50° C. to trigger the polycondensation reaction at the interface. After 7 days, a free-standing COF film with shiny reflection was observed on the water surface. The resultant 2D boronate ester polymer film on water was robust enough to be fully transferred onto different substrates for morphological and structural characterizations, such as on $Si/SiO_2$ substrate and TEM grid.

Figure 14:
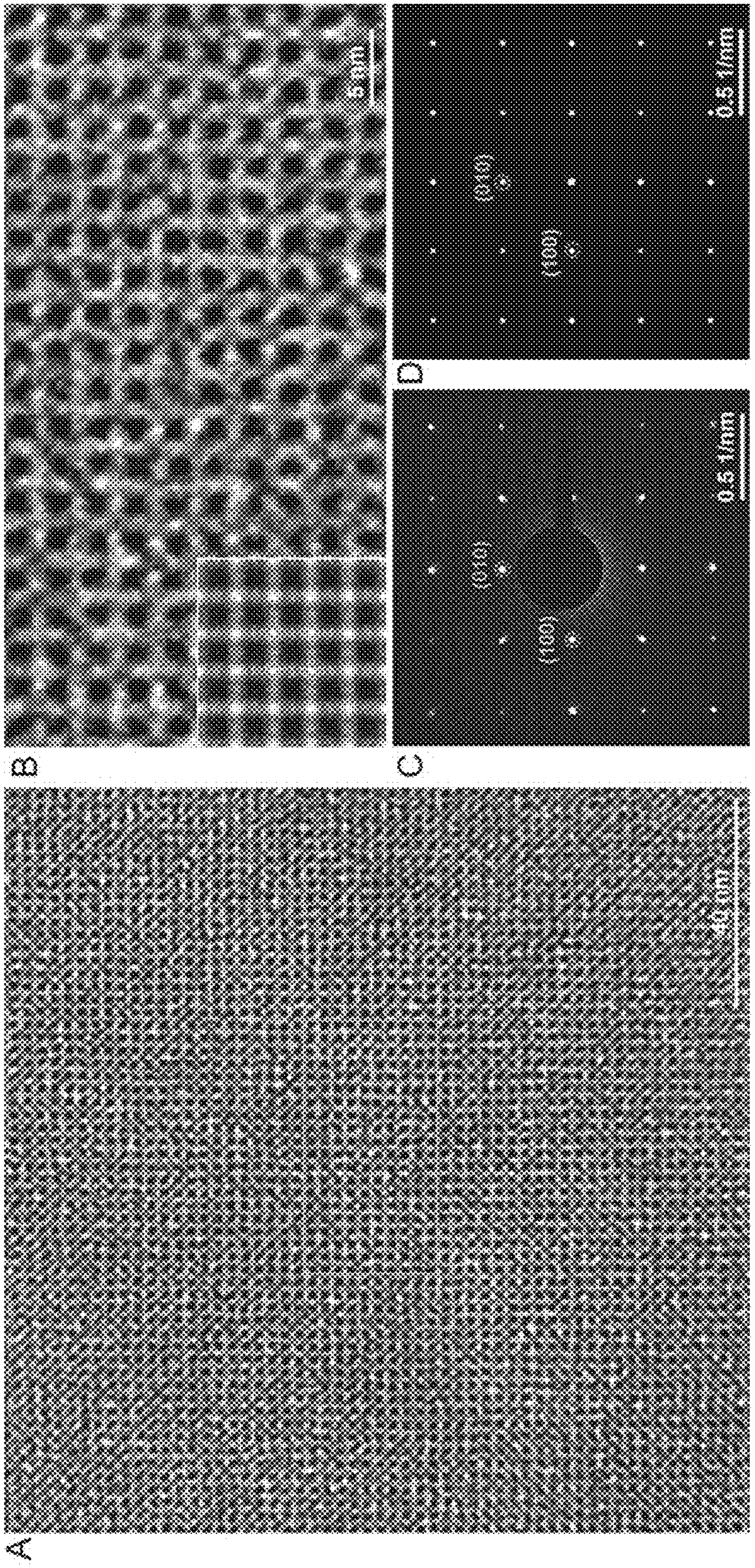
FIG. 14 shows (A) HR-TEM image of 2D boronate ester polymer film. (B) Enlarged HR-TEM image from the region in image A (square). Inset is lattice-averaged image calculated from the DFT. (C) Experimental and D) simulated electron-diffraction patterns, the circles indicate the (100) and (010) planes, respectively.

The molecular structure of the 2D boronate ester polymer film, in particular the single crystalline domains, were visualized by HR-TEM (FIG. 14 A), which shows long-range ordered square lattices (FIG. 14 A and B). Based on HR-TEM image simulation, the darkest part corresponds to the pores between the porphyrin units while the bright region shows the square arrangement of the 2D boronate ester polymer backbones. The selected-area electron diffraction (SAED) pattern (FIG. 14 C) displays a square diffraction pattern with nearest reflections corresponding to 0.406 $nm^{-1}$ (i.e., a=b=2.46 nm, γ=90°), which is in line with the AA-eclipsed stacked atomic model of 2D boronate ester polymer film derived by density functional theory (DFT) calculation (calculated reflection at (100) and (010): 0.402 nm-1; FIG. 14 D). The result shows high crystallinity of the 2D polymer film.

Horizontal Synthesis of 2D Polythiophenes on Water Surface

Figure 15A:
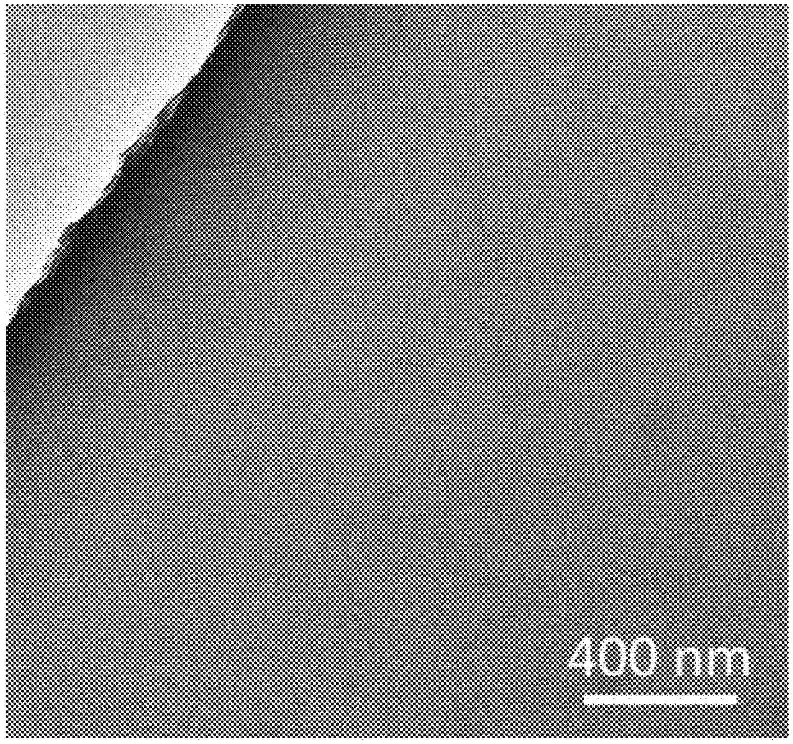
FIG. 15 shows the morphology and diffraction data of the polythiophene film. (A) TEM image. (B) Selected area electron diffraction (SAED) pattern of the film, showing a diffraction feature at 4.6 Å and a hexagonal lattice.
Figure 15B:
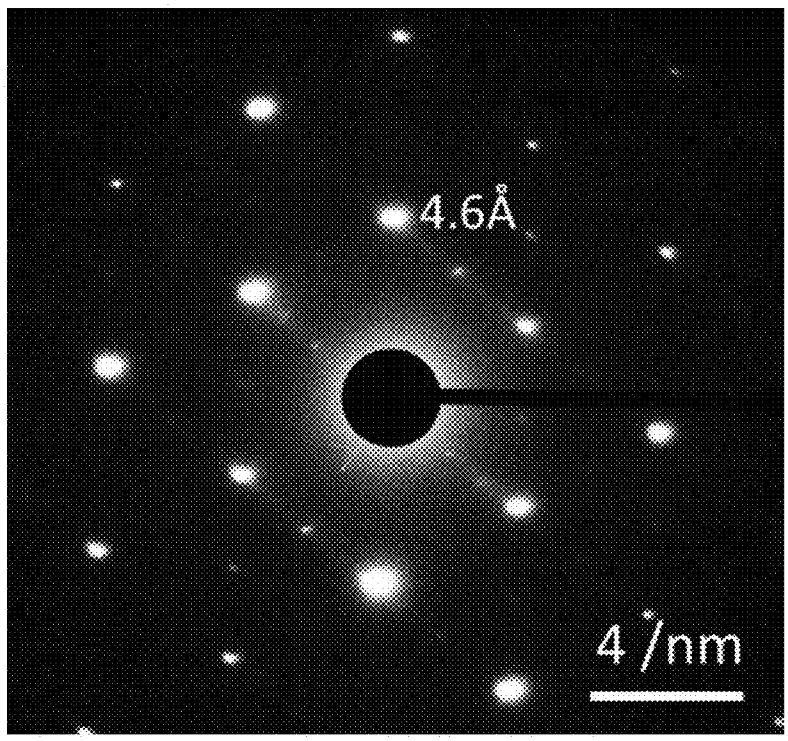

As shown in FIG. 15, the CTAB monolayer was built on the water surface in a 200 ml beaker (containing 150 ml water) as the first step; then the thiophene suspension, that contains 0.05 ml thiophene and 0.5 mg SDS surfactant in 0.5 ml MiliQ water, was injected into aqueous subphase. The SDS surfactant assists the thiophene to form a stable suspension. Subsequently, the polymerization was triggered by adding 10 mg ammonium persulfate (APS) and 0.5 ml HCl (37%). After 12 h reaction, there was a grey film floating on water surface. The film was transferred onto different substrates for various characterizations.

As shown in FIG. 15 A, the film was a large area sheet, which can be characterized by selected area electron diffraction (SAED) showing the first ordering of 4.6 Å and a hexagonal lattice. The crystallinity was further analyzed by Grazing-Incidence Wide-Angle X-ray Scattering (GIWAXS).

CITED NON-PATENT LITERATURE

Bieri, M., Treier, M., Cai, J., Ait-Mansour, K., Ruffieux, P., Gröning, O., Gröning, P., Kastler, M., Rieger, M., Feng, X., Müllen, K., Fasel, R. (2009) Porous graphenes: two-dimensional polymer synthesis with atomic precision. Chem. Commun. 45, 6919-6921.

Blumstein, A., Herz, J., Sinn, V., Sadron, C. (1958) Sur un procede de polymerisation en couche adsorbee. Comptes Rendus Acad. Sci. 246, 1856-1858.

Bunck, D. N., Dichtel, W. R. (2013) Bulk synthesis of exfoliated two-dimensional polymers using hydrazine-linked covalent organic frameworks. J Am. Chem. Soc. 135, 14952-14955.

Cardenas, L., Gutzler, R., Lipton-Duffin, J., Fu, C., Brusso, J. L., Dinca, L. E., Vondracek, M., Fagot-Revurat, Y., Malterre D., Rosei, F., Perepichka, D. F. (2013) Synthesis and electronic structure of a two dimensional-conjugated polythiophene. Chem. Sci. 4, 3263-3268.

Chen, L., Hernandez, Y., Feng, X., Mullen, K. (2012) From nanographene and graphene nanoribbons to graphene sheets: chemical synthesis. Angew. Chem. Int. Ed. 51, 7640-7654.

Deng, Y. F., Sun, J. X., Jin, H., Khatib, M., Li, X. H., Wei, Z. S., Wang, F., Horev, Y. D., Wu, W., Haick, H. (2018) Chemically modified polyaniline for the detection of volatile biomarkers of minimal sensitivity to humidity and bending. Adv. Healthc. Mater. 7(15), 1800232.

Duan H, Lyu P, Liu J, Zhao Y, Xu Y (2019) Semiconducting Crystalline Two-Dimensional Polyimide Nanosheets with Superior Sodium Storage Properties. ACS Nano 13, 2473-2480.

Gee, G. (1935) Reactions in monolayers of drying oils. Ii. Polymerization of the oxidized forms of the maleic anhydride compound of beta elaeostearin. Proc. Royal Soc. A. 153, 129-141.

Grill, L., Dyer, M., Lafferentz, L., Persson, M., Peters, M. V., Hecht, S. (2007) Nano-architectures by covalent assembly of molecular building blocks. Nat. Nanotechnol. 2, 687-691.

Kaganer, V. M., Mohwald, H., Dutta, P. (1999) Structure and phase transitions in Langmuir monolayers. Rev. Mod. Phys. 71, 779-819.

Kissel, P., Erni, R., Schweizer, W. B., Rossell, M. D., King, B. T., Bauer, T., Götzinger, S., Schlüter, A. D., Sakamoto, J. (2012) A two-dimensional polymer prepared by organic synthesis. Nat. Chem. 4, 287-291.

Novoselov, K. S., Geim, A. K., Morozov, S. V., Jiang, D., Zhang, Y., Dubonos, S. V., Grigorieva, I. V., Firsov, A. A. (2004) Electric field effect in atomically thin carbon films. Science 306, 666-669.

Sahabudeen, H., Qi, H., Glatz, B. A., Tranca, D., Dong, R., Hou, Y., Zhang, T., Kuttner, C., Lehnert, T., Seifert, G., Kaiser, U., Fery, A., Zheng, Z., Feng, X. (2016) Wafer-sized multifunctional polyimine-based two-dimensional conjugated polymers with high mechanical stiffness. Nat. Commun. 7, 13461.

Sahabudeen H, Dong R, Feng X (2019) Interfacial Synthesis of Structurally Defined Organic Two-dimensional Materials: Progress and Perspectives. Chimia International Journal for Chemistry 73 (6) 480-486.

Staudinger, H. (1920) Uber Polymerisation. Ber. Dtsch. Chem. Ges. 53, 1073-1085.

Stupp, S., Son, S., Lin, H., Li, L. (1993) Synthesis of two-dimensional polymers. Science 259, 59-63.

Wang, Y., Liu, J. L., Tran, H. D., Mecklenburg, M., Guan, X. N., Stieg, A. Z., Regan, B. C., Martin, D. C., Kraner, R. B. (2012) Morphological and dimensional control via hierarchical assembly of doped oligoaniline single crystals. J. Am. Chem. Soc. 134(22), 9251-9262.

Xiao X, Wang Z, Hu Z, He T (2010) Single Crystals of Polythiophene with Different Molecular Con-formations Obtained by Tetrahydrofuran Vapor Annealing and Controlling Solvent Evaporation. Journal of Physical Chemistry Part B 114 (22), 7452-7460.

Xu X, Zhang Z, Dong J, Yi D, Niu J, Wu M, Lin L, Yin R, Li M, Zhou J, Wang S, Sun J, Duan X, Gao P, Jiang Y, Wu X, Peng H, Ruoff R S, Liu Z, Yu D, Wang E, Ding F, Liu K (2017) Ultrafast epitaxial growth of metre-sized single-crystal graphene on industrial Cu foil. Science Bulletin 62 (15), 1074-1080.

Yang Q H, Tu Z Y, Zhao N Y (2016) Research on interfacial polymerization of pyrrole assist with Span80 system. IOP Conference Series: Materials Science and Engineering 137, 012070.

REFERENCE SIGNS

1 Monomer
2 Further monomer
3 Surfactant
4 Polymer

The invention claimed is:

1. A two-dimensional (2D) or quasi-two-dimensional (q2D) polymer film consisting of aromatic monomers, wherein the aromatic monomers comprise at least one monomer and a further monomer, wherein the at least one monomer and the further monomer are different, wherein the ratio of crystalline areas to the total surface area is 50% to 100%, wherein the average crystal domain size is in the range of 0.1 $\mu m^2$ to 1 $cm^2$, wherein the film thickness is in the range of 0.1 nm to 80 nm.

2. The 2D or q2D polymer film of claim 1, consisting of a polyamide, polyaniline, polyazine, polyboronic acid ester, polyfuran, polyhydrazone, polyimide, polyimine, poly-β-ketoenamine, polypyrrole, polyselenophene or polythiophene.

3. A 2D or q2D polymer film of claim 1, wherein the film thickness is in the range of 1 nm to 10 nm.

4. The 2D or q2D polymer film of claim 1, wherein the average crystal domain size is in the range of 0.1 $\mu m^2$ to 100 $\mu m^2$.

5. A membrane, electronic device, or catalyst comprising the 2D or q2D polymer film according to claim 1.

6. The 2D or q2D polymer film of claim 1, wherein the at least one monomer is selected from the group consisting of alcohol, aldehyde, alkyne, amine, anhydride, aniline, boronic acid, carboxylic acid, diamine, diole, β-dione, furan, halocarbon, hydrazine, hydroxyaldehyde, pyrrole, selenophene, and thiophene, wherein the further monomer is selected from the group consisting of diole, aldehyde, β-dione, anhydride, and carboxylic acid.

7. The 2D or q2D polymer film of claim 1, wherein the at least one monomer and the further monomer are a pair selected from boronic acid and diole, amine and aldehyde, hydrazine and aldehyde, carbohydrazide and aldehyde, amine and β-dione, amine and anhydride, or amine and carboxylic acid.

8. A method for synthesis of a two-dimensional (2D) or quasi-two-dimensional (q2D) polymer film according to claim 1 comprising the steps a) providing a surfactant monolayer and the at least one monomer in a polar solvent, wherein the surfactant monolayer aligns with an interface of the polar solvent with air, wherein the at least one monomer interacts with the surfactant monolayer, wherein the at least one monomer is an aromatic monomer, b) initiating a polymerization of the at least one monomer, wherein the initiating a polymerization is achieved by addition of the further monomer, and c) polymerizing and developing a 2D or q2D polymer film.

9. The method according to claim 8, wherein the surfactant is selected from the group consisting of dihexadecyl phosphate, hexadecyltrimethylammonium bromide, lignoceryl alcohol, oleic acid, perfluorooctadecanoic acid, sodium dodecylbenzenesulfonate, sodium (9Z)-octadec-9-en-1-yl sulfate, sodium stearate, stearic acid, and triethanolammonium dihexadecylphosphate.

10. The method according to claim 9, wherein the at least one monomer is selected from alcohol, aldehyde, alkyne, amine, anhydride, aniline, boronic acid, carboxylic acid, diamine, diole, β-dione, furan, halocarbon, hydrazine, hydroxyaldehyde, pyrrole, selenophene and/or thiophene.

11. The method according to claim 10, wherein the at least one monomer comprises an aromatic group, wherein the aromatic group is benzene, furan, naphthalene, perylene, porphyrin, pyrrole, thiophene, tetraphenylethylene, tetraphenylporphyrin, triphenylbenzene or triphenyltriazine.

12. The method according to claim 11, wherein:

the polar solvent in step a) is water and/or a water miscible solvent; and a hydrophilic group of the surfactant interacts with the at least one monomer by electrostatic interaction or a covalent bond.

13. The method according to claim 8, wherein the at least one monomer is selected from alcohol, aldehyde, alkyne, amine, anhydride, aniline, boronic acid, carboxylic acid, diamine, diole, β-dione, furan, halocarbon, hydrazine, hydroxyaldehyde, pyrrole, selenophene and/or thiophene.

14. The method according to claim 8, wherein the at least one monomer comprises an aromatic group, wherein the aromatic group is benzene, furan, naphthalene, perylene, porphyrin, pyrrole, thiophene, tetraphenylethylene, tetraphenylporphyrin, triphenylbenzene or triphenyltriazine.

15. The method according to claim 8, wherein the polar solvent in step a) is water and/or a water miscible solvent.

16. The method according to claim 8, wherein a hydrophilic group of the surfactant interacts with the at least one monomer by electrostatic interaction or a covalent bond.

17. The method according to claim 8, wherein the at least one monomer comprises at least three functional groups, wherein the at least three functional groups of the monomer are identical or different.

18. The method according to claim 17, wherein the further monomer comprises at least two functional groups.

19. The method of claim 18, wherein the at least one monomer and the further monomer are a pair selected from boronic acid and diole, amine and aldehyde, hydrazine and aldehyde, carbohydrazide and aldehyde, amine and β-dione, amine and anhydride or amine and carboxylic acid.

20. The method according to claim 8, wherein the at least one monomer comprises one or two functional groups and the initiating a polymerization according to step b) is achieved by addition of at least one polymerization initiator.

* * * * *